March 4, 1947.  A. W. BORSUM  2,416,678
ELECTRONIC RATIO BRIDGE SYSTEM REPEATER
Filed Dec. 17, 1941  8 Sheets-Sheet 1
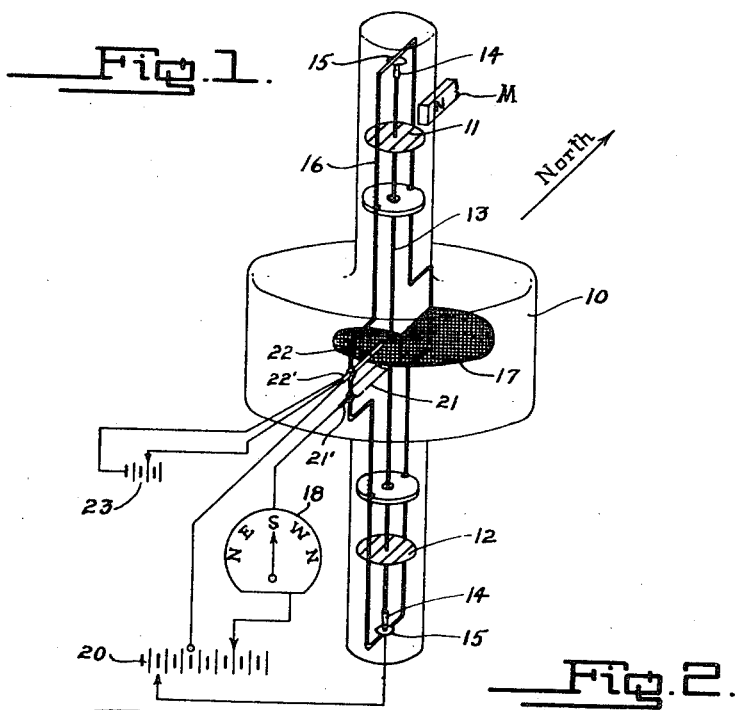
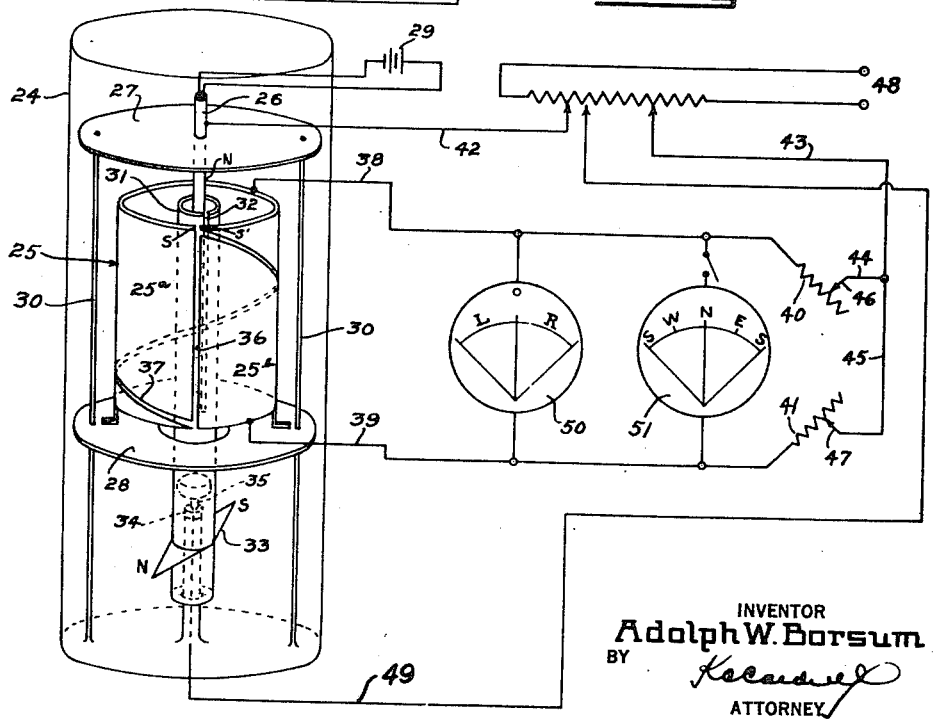
INVENTOR
Adolph W. Borsum
BY
ATTORNEY

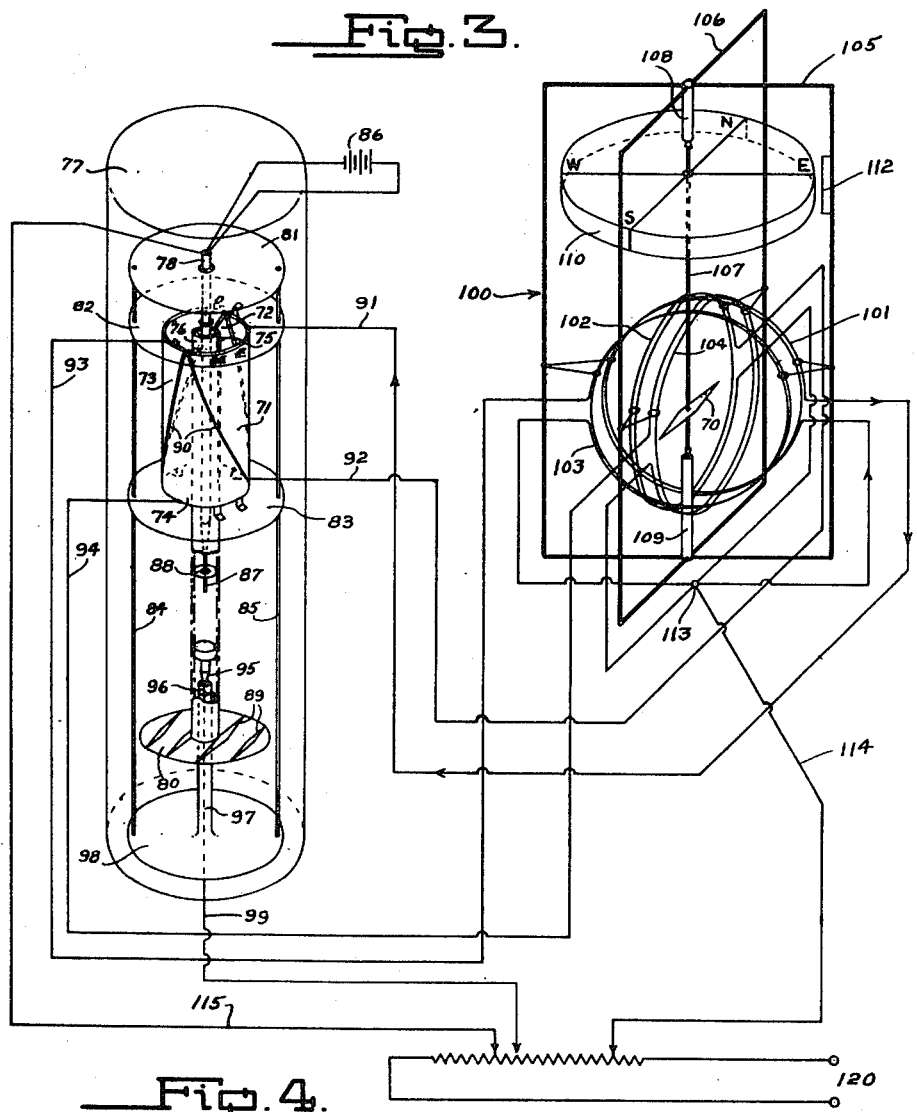
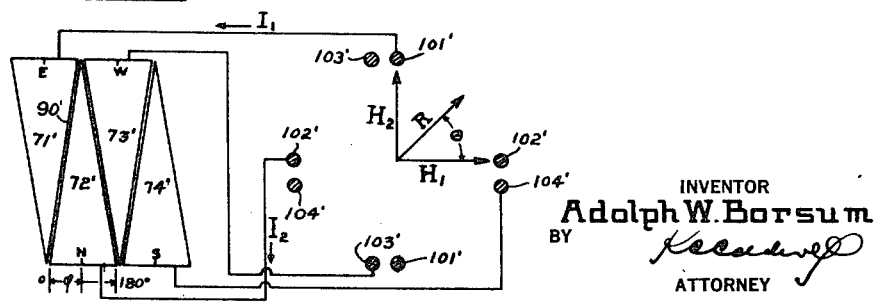

March 4, 1947. A. W. BORSUM 2,416,678
ELECTRONIC RATIO BRIDGE SYSTEM REPEATER
Filed Dec. 17, 1941 8 Sheets-Sheet 3
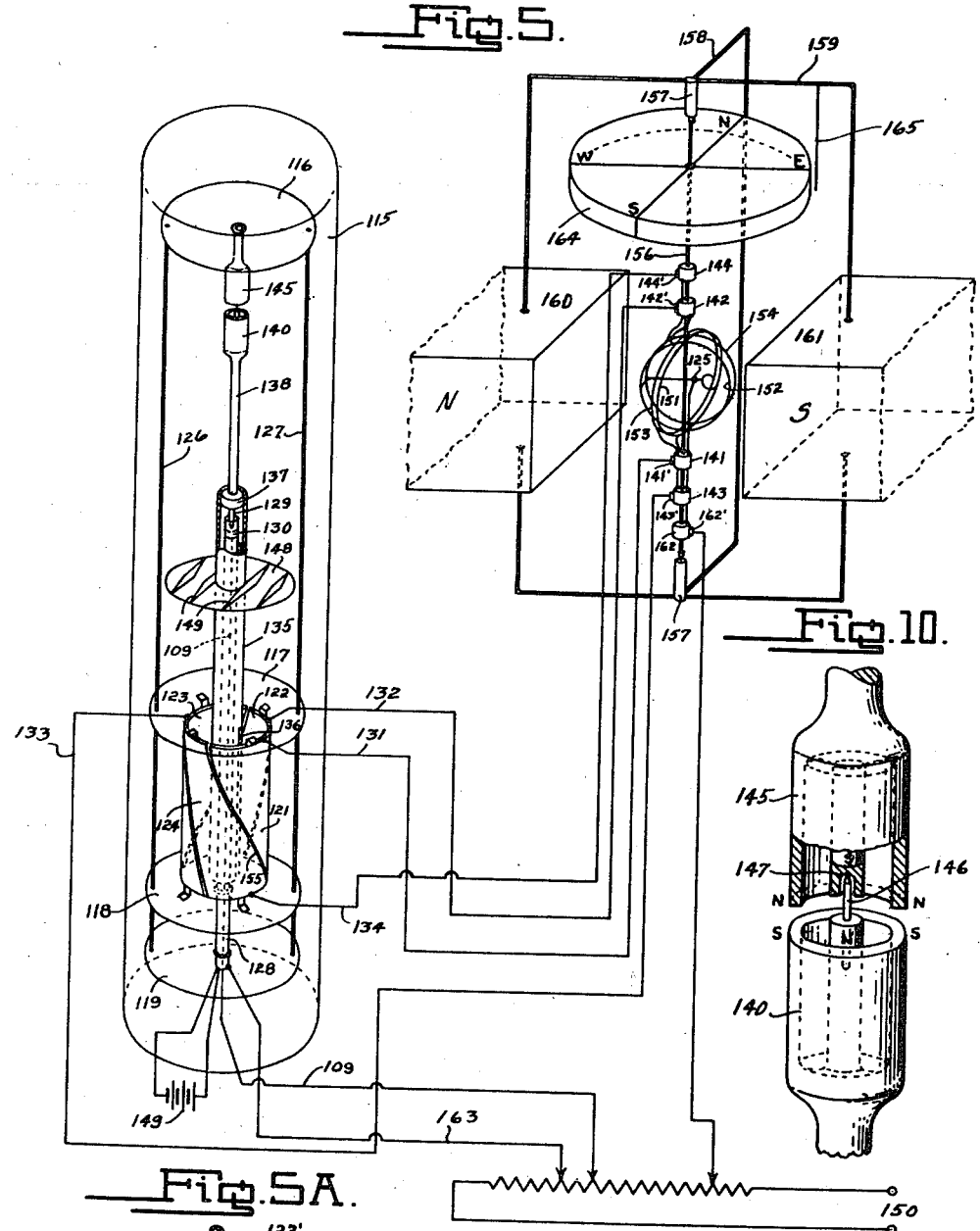
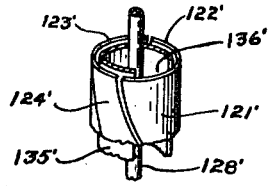
INVENTOR
Adolph W. Borsum
BY
ATTORNEY March 4, 1947.  A. W. BORSUM  2,416,678
ELECTRONIC RATIO BRIDGE SYSTEM REPEATER
Filed Dec. 17, 1941  8 Sheets-Sheet 4

INVENTOR
Adolph W. Borsum
BY
ATTORNEY

March 4, 1947.  A. W. BORSUM  2,416,678
ELECTRONIC RATIO BRIDGE SYSTEM REPEATER
Filed Dec. 17, 1941  8 Sheets-Sheet 5

INVENTOR
Adolph W. Borsum
BY
ATTORNEY

March 4, 1947.　　　A. W. BORSUM　　　2,416,678
ELECTRONIC RATIO BRIDGE SYSTEM REPEATER
Filed Dec. 17, 1941　　　8 Sheets-Sheet 6
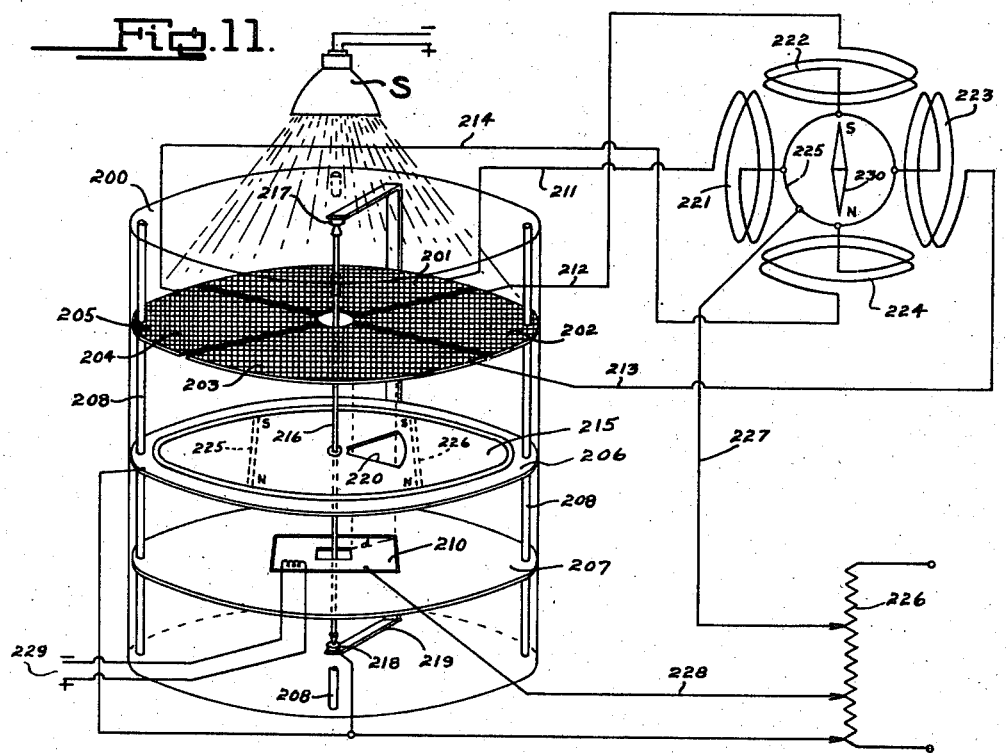
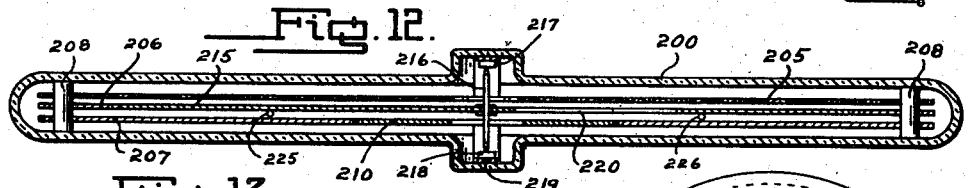
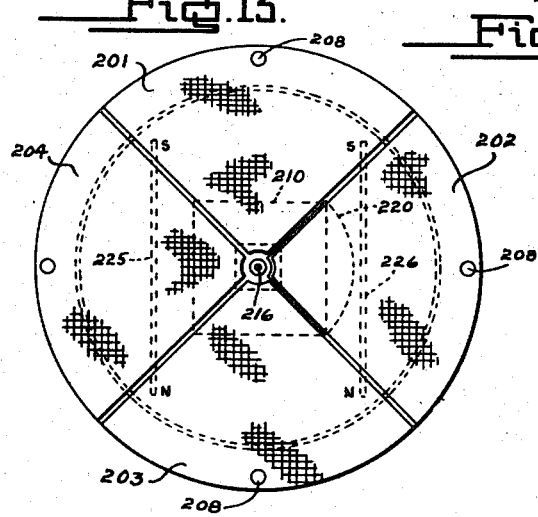
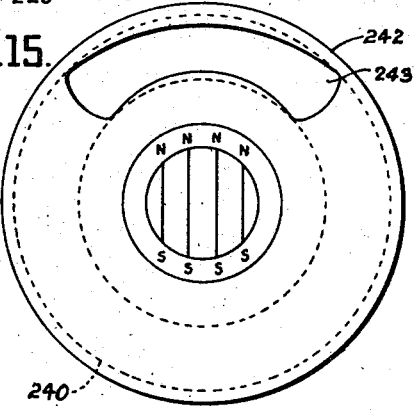
INVENTOR
Adolph W. Borsum
BY
ATTORNEY March 4, 1947. A. W. BORSUM 2,416,678
ELECTRONIC RATIO BRIDGE SYSTEM REPEATER
Filed Dec. 17, 1941 8 Sheets-Sheet 7

INVENTOR
Adolph W. Borsum
BY
ATTORNEY

March 4, 1947.  A. W. BORSUM  2,416,678
ELECTRONIC RATIO BRIDGE SYSTEM REPEATER
Filed Dec. 17, 1941  8 Sheets-Sheet 8

INVENTOR
Adolph W. Borsum
BY
ATTORNEY

Patented Mar. 4, 1947

2,416,678

UNITED STATES PATENT OFFICE 2,416,678

ELECTRONIC RATIO BRIDGE SYSTEM REPEATER

Adolph W. Borsum, United States Navy

Application December 17, 1941, Serial No. 423,359

17 Claims. (Cl. 177—351)

(Granted under the act of March 3, 1883, as amended April 30, 1928; 370 O. G. 757)

This invention relates to a tele-indicating system or an annunciator system for transmitting information, and more particularly to a tele-indicating or annunciating system incorporating a vacuum tube having an electron emissive electrode, and an apparatus for forming a directional beam of electron emission therefrom, in which certain mechanical displacements are utilized to variously proportion the extent of the active area or beam affected area of a plurality of anodes positioned to receive the directed electron beam. The electron space current or total current flowing between the anodes and the cathodes will be proportioned between the circuits connected to these anodes as the extent of the active area or beam affected area of the anodes changes, whereby an accurate current radio in each circuit may be established in accordance with some function of the said mechanical displacement.

Numerous devices and methods have been proposed, many of which are to be found in prior patented literature for repeating at a distance the directional indication of a magnetic compass. These prior art devices incorporate different types of transmitters for the follow up systems, including those utilizing permanently magnetized members, photo-sensitive devices, variable electrolytic resistance elements, cathode ray and electronic devices. The tele-indicating system embodied in this invention may be readily utilized to transmit and indicate magnetic directions, but may be useful generally to transmit information by means of angular changes in the position of the indicator of a receiving instrument.

It is an object of this invention to provide a tele-indicating system in which the angular motion of the repeating instrument will follow precisely the angular motion of the transmitter.

It is a further object of this invention to provide a tele-indicating system in which the angular motion of the repeating instrument will follow precisely the angular motion of the transmitter through continued rotation.

It is also a further object to provide a tele-indicating system incorporating a space discharge device in which the anodes are configured so that the repeating instrument will follow precisely the angular motion of the transmitter.

It is also an object of this invention to provide a Wheatstone bridge circuit incorporating a space discharge device which transmits precisely to a repeating instrument connected across the output diagonals thereof, angular values ranging from zero to 180°.

It is another object of this invention to provide a tele-indicating system which will give both a coarse and a fine indication of an angular displacement.

It is another object of this invention to provide a space discharge device by which a highly accurate and precise adjustment or division of the plate current included in a plurality of control circuits may be obtained by adjusting the extent of the active area of each anode positioned within a restricted electron beam formed from the cathode emission. Apparatus for producing this improved result utilizes a substantially constant total beam affected area of the anodes, producing a current of substantially constant magnitude and variously proportions the current between each of said plurality of control circuits.

This invention offers a further advantage in that the changes in the ratio of the plate current proportioned between the control circuits may be governed by the design of the adjacent edges of the anodes, so that the ratio of current flow in these control circuits may vary from zero to infinity as the electron beam moves relative to the anodes so as to generate an angle equal to 360°/N wherein N is equal to the number of anodes. It is a specific object of this invention to provide a space discharge device having the edges of the adjacent anode segments configured so that the beam affected areas may be combined to produce ratios which vary in accordance with the tangent of an angle $n\theta$ generated by the medial line of the beam from a reference point on an anode wherein n is an integer and is the number of anode segments divided by four, and $\theta$ varies from zero to 360°/N, when N is equal to the number of anode segments.

It is a more general object of this invention to provide a vacuum tube having a cathode and a plurality of anodes with means for causing the electron emission of the cathode reaching the plurality of anodes to be varyingly proportioned between the said anodes so that the beam affected area may be combined to produce ratios which vary from zero to infinity in accordance with the angle θ generated by the medial line of the beam from 0 reference point on an anode as the beam and anode rotate relatively through an angle which varies from zero to 360°/N when N is the number of anode segments.

It is a further object of this invention to have the configuration of the divisional line formed by the adjacent spaced edges of the anode segments determined by the current magnitudes flowing in adjacent coils of the repeating instrument, the vectorial sum of which will produce a resultant magnetic field having an angular position relative to the axis of one of said coils which is equal to the angle, or some multiple thereof which the medial line of the beam makes with a reference point on an anode as the beam and anode rotate relatively through an angle from zero to 360°/N with N equal to the number of anode segments.

It is a well known fact of electronics that the plate current or space current of a vacuum tube changes rapidly with changes in filament temperature or plate potential. In order to prevent variations from appearing on the repeating instrument which indicates angular displacements a bridge circuit is preferably employed. Consequently, all fluctuations in plate voltage or changes in temperature of the cathode causing a subsequent change in electron emission therefrom will have no effect upon the ratios of the currents flowing in the various control circuits connected to the anodes.

It is therefore an object of this invention to provide an electronic tele-indicating system utilizing a Wheatstone bridge circuit, two variable ratio arms of which include divisional portions of the plate current of a suitable vacuum tube.

It is a further object to provide a tele-indicating system incorporating a vacuum tube utilizing the features of the electronic Wheatstone bridge system for indicating the angular position of the axis of a body relative to a perpendicular.

It is another object of this invention to provide an angle tele-indicating apparatus incorporating a vacuum tube having a rotatable apparatus for forming from the emission of the cathode an electron beam, and a plurality of anode segments the number of which is a multiple of the number of coils of the repeating instrument connected thereto, whereby upon complete rotation of said rotatable apparatus the pointer of said repeating instrument will have completed a number of revolutions equivalent to said multiple.

It is also an object of this invention to employ the conventional magnetic compass in the repeating instrument of the electronic bridge system so that its movable magnets will be acted upon by an amplified magnetic field which tends to reduce the northerly turning error encountered in the conventional aircraft compass.

It is also a further object of this invention to provide an improved transmitter and repeater in an electronic tele-indicating system in which the friction at the cap and pivot is reduced by utilizing the mechanical forces present in an electrostatic field.

It is a still further object of this invention to provide a compass for aircraft or the like which possesses the simplicity of construction of the magnetic compass, the stabilization that is afforded by the gyroscopic compass and the ability to transmit directional indications of the master compass to a remotely located indicator which may include the ordinary magnetic compass.

The modern service aircraft is being built with armor protected areas utilizing magnetizable metals which make the magnetic compass unreliable when in a location visible to the pilot or to the navigator. Therefore, if as is desirable a magnetic compass is to be used, it is necessary to have an accurate and reliable repeater which may include the conventional magnetic compass and will enable the master compass to be positioned in a remote part of the craft so as to be in a uniform earth's field unaffected by distortions caused by the armored areas.

As stated heretofore, the system of tele-indicating embodied in this invention is especially adapted for use with a magnetic compass, and will be illustrated and described with this preferred use in mind, but it should be understood that it is not necessarily limited to this particular application or to any of the particular applications referred to above, and may be useful generally to transmit from one location by means of an electronic transmitter, to an indicator or repeater located at some distant place, any angular position whether produced manually or otherwise.

It is also to be noted that the thermionic high vacuum tube has been selected to illustrate principles embodied in this invention with the understanding, however, that this invention is not so limited and may include discharge tubes of the gaseous and vapor type.

If the electron source in a vacuum tube is a hot cathode, the electrons will emanate from it in all directions, with the electron stream spreading out as the distance from the cathode increases. This electron emission may be restricted to a directional path and the spreading prevented by means of an electric or magnetic field applied to the stream in a manner well known to the art, or preferably a shield may be provided surrounding the cathode which is impervious to the electron emission therefrom but which has a suitable opening formed therein for permitting a direct beam of electron emission to pass therethrough. This beam constitutes the space current and is in accordance with this invention proportionally divided between two or more anodes to proportion the current flow in each circuit connected to said anodes. In order that the electron beam of cathode emission be variably proportioned between the anodes, it is essential that relative movement be provided between the beam and the said anodes. If the beam is formed by electromagnetic means, it is generally preferable to move the anodes relative thereto in order to adjust the effective area of each anode receiving the electron emission. If, however, a shield is to be used, it is usually preferable to move this shield relative to the anodes, because by using a slender cylinder tube for the shield which may be secured to a magnetized member, the moment of inertia of this movable shield and magnetized member may be kept at a desired minimum, thereby reducing its period.

The particular advantages of this invention will appear more fully hereinafter from the following description taken together with the accompanying drawings, which illustrate its various embodiments. It is to be understood, however, that the drawings are for the purpose of illustration and not for the purpose of limitation, reference being had for this latter purpose to the appended claims.

Examples of certain modifications of this invention are illustrated in the accompanying drawings wherein:

Fig. 1 illustrates diagrammatically an elementary form of the invention for utilizing a high vacuum thermionic tube to remotely indicate magnetic directions;

Fig. 2 illustrates diagrammatically by means of a wiring diagram an improved embodiment of the applicant's invention as applied to a Wheatstone bridge circuit;

Fig. 3 is a diagrammatic view illustrating the structure and circuit connections of an improved electronic repeater system capable of repeating magnetic directions or angular positions through 360°;

Fig. 4 is a developed view of the segmental anodes showing the configuration of each and the circuit connections to their respective coils;

Fig. 5 is a diagrammatic view illustrating the structure and circuit connections of a modification of the repeater system illustrated in Fig. 3;

Fig. 5A is an enlarged fragmentary view showing an enlarged electron director positioned closely adjacent the anodes;

Fig. 10 is an enlarged view of the permanent magnets utilized in the transmitter illustrated in Fig. 6 for reducing the cap and pivot friction;

Fig. 11 is a diagrammatic illustration of a further embodiment of this invention showing by means of an exploded view, the structure of a space discharge device and its circuit connections;

Fig. 12 is an enlarged cross-sectional view through the space discharge device illustrated in Fig. 11;

Fig. 13 is an elevational view of the space discharge device shown in Fig. 11;

Fig. 15 is an elevational view of a further modification;

Figure 7:
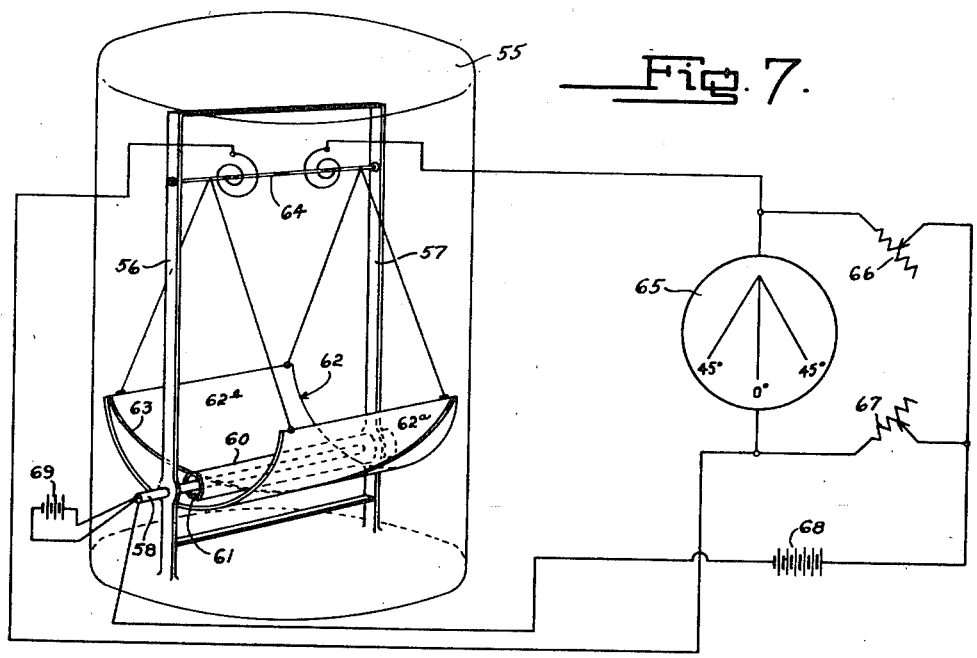
Fig. 7 illustrates diagrammatically the structure and circuit connections of an electronic bridge repeating system for indicating angular positions relative to a perpendicular established by the pendulously stabilized electrodes of the vacuum tube incorporated therein.

Referring to Fig. 1, wherein a rudimentary form of this invention is illustrated, reference numeral 10 is used to indicate generally a sealed envelope which encloses plural sets of permanent magnets 11 and 12. Each set of these magnets is secured to a longitudinal shaft 13 which is in turn rotatably supported in a frame 16, also included within the enclosing envelope, by means of a pin 14 and cap 15 arranged at each end thereof. The magnets may therefore move freely relative to the envelope to assume a fixed position relative to the lines of force constituting the earth's magnetic field or other magnetic fields applied to produce rotation of the magnets. The magnet M may be utilized to effect movement of the magnet sets 11 and 12. The earth's field is indicated by the arrow. The position of the magnets is independent of the angular position of the body upon which the vacuum tube is mounted and will retain its fixed position relative to the earth's magnetic field irrespective of the angular position of the said body relative thereto.

Also secured to this shaft so as to be rotatable therewith in an enlarged portion of the enclosing envelope and substantially midway between the pivots is a disc-like screen grid element 17. This grid element is connected to a suitable potential source 20 so that its potential bias may be adjusted if it is to act as a control grid. As an alternative, it may be connected so that its potential bias is fixed, in which event it serves as a shielding electrode only.

The anode 21 and cathode 22 are axially spaced on opposite sides of the grid elements and are secured to the enclosing envelope preferably by means of a suitable sealed terminal 21' and 22' which projects exteriorly of the enclosing envelope and may be positioned to form the usual plug connection. The cathode 22 is supplied with a heating current by the battery 23 which causes the temperature rise necessary for the emission of the electrons. A galvanometer 18 having calibrations thereon indicating magnetic directions is connected to the electrical power supply source 20 in series with the terminals 21' and 22' leading from said anode and said cathode.

The use of the plurality of pivots for the shaft 13 to which the magnets 11 and 12 are secured is unconventional in compass design because it would normally produce an excessive amount of friction at the cap and pivots which would prevent proper orientation of the magnetic elements. However, when this compass is mounted on an aircraft, it is constantly subjected to high frequency vibrations which considerably reduce the friction at these pivots and permit proper orientation of the magnets to a position parallel with the lines of force of the earth's magnetic field.

The device illustrated in Fig. 1 operates as follows:

The shaft 13, magnets 11 and 12 and grid 17 will, as a unit, remain in a definite angular position relative to the magnetic meridian or other magnetic field, while the sealed envelope 10, frame 16, cathode 22 and anode 21 will revolve as a unit around the magnetic system whenever there is a change in direction. For example:

At zero degrees north there will flow a minimum or zero number of electrons from the cathode to the anode because the anode in this position is completely covered by the disc-like grid element 17. Then, as changes in compass direction result in changes in position of the cathode and anode relative to the grid, for example, from zero degrees north to 90° east, there will be a proportionate increase in the flow of electrons for each and every degree change until, at 90° east, 25% of the effective area of the cathode will have been uncovered and naturally 25% of the total available electrons will flow to the anode. Similar changes result in an increase in the number of electrons flowing between the anode and cathode for each angular change until finally, just before 360° has been reached, the maximum flow will be realized. It should be understood that when the grid is in the 360° or 0° position substantially no electron flow will be present. The instrument is unstable in this position because of the rapid change in exposed area for slight variations in magnetic directions.

There are numerous disadvantages in the type of repeater for the magnetic compass illustrated in Fig. 1 which are avoided in the other modifications to be presented hereinafter. For example, the plate voltage and cathode temperature may not under all conditions remain constant. Consequently, any variation causing a change in the electron current would be detected in the galvanometer and would appear erroneously as a change in magnetic direction.

This particular tube does, however, possess certain advantages when used otherwise than in compass repeater systems, particularly in the design of the control electrode or grid, since by using a flat, disc-like electrode it is easy to configure it so that the current flow between the anode and the cathode may be varied in accordance with any function of the angular displacement of the control electrode relative to the cathode.

In order to avoid the disadvantages encountered in the particular type of tube illustrated in Fig. 1 wherein the variations in the plate voltage or cathode temperature produce variations in the plate current which are reproduced as changes in angular or mechanical displacement, an electronic ratio system, the wiring diagram of which is illustrated by Fig. 2, was developed. In this modification the space discharge tube consists of a sealed envelope 24 which encloses a cylindrical electron emissive cathode 26 and a cylindrical anode 25 coaxially spaced therefrom. This cylindrical anode 25 is split into two portions which are secured to the insulated discs 27 and 28 which are spaced from each other and from the base, by means of the rods 30 contained within and secured to the sealed envelope so as to be electrically insulated from each other.

A cylindrical metallic tube 31 which is impervious to electron flow except for a longitudinal slot 32 formed therein, is coaxially spaced between the anode 25 and the cathode 26. This tube, which is hereinafter referred to as the electron director, allows the electrons to pass freely from the cathode 26 through the slot 32 on to the anode 25 and in so doing forms from the electron emission of the cathode a rectangular beam of electrons. The length of the slot 32 is governed by the length of the emitting material forming the cathode 26 whereas the width of the slot is selected to govern the width of the beam when taken in consideration with the underlying principles of the electron optics.

It is well known, for example, that the electrons spread out as their distance from the emitting material increases, and therefore, to restrict this spreading out effect, shields may be provided which protrude radially from the longitudinal margins of the slot 32 or the diameter of the director may be increased as in Fig. 5A. This slotted electron director 31 has attached to it a magnetic needle 33 which, together with the electron director, is supported for rotation in the frame and envelope by means of a cap 34 and pin 35. A guide means similar to that illustrated in Fig. 3 is also provided but not shown in this view. The electron director may, therefore, be easily positioned by any external magnetic field which includes the earth's magnetic field in case the system is to be used as a repeater for a magnetic compass. The electron director thus guides the electron emission of the cathode in the form of a rectangular beam through the slot 32 to the anode 25 and also controls the position of this beam relative to the anode surfaces.

In order that this beam be variably proportioned between the anodes upon movement relative thereto, to produce a ratio division of current magnitude in the circuits which are connected to the anodes, the cylindrical anode 25 is split along line 36 parallel to its axis and also along line 37 spirally or helically of its axis and is thus divided into at least two separate segments indicated on the drawings at 25$^a$ and 25$^b$ which are hereinafter referred to as the anode ratio arms.

Each of these anode ratio arms has a sealed terminal secured thereto which projects externally of the enclosing envelope. For each angular change that a point on the anode makes with the electron beam there will be established a definite division of the total number of electrons included within this beam between the anode ratio arms 25$^a$ and 25$^b$. This ratio of electron flow changes for each position of the electron beam, because as the exposed area or beam affected area of one anode ratio arm is increased the exposed area or beam affected area of the other ratio arm is simultaneously decreased in direct ratio.

Fig. 2 also illustrates by means of the wiring diagram the method of connecting this space discharge device in a Wheatstone bridge circuit. The terminals 38 and 39 leading to the anodes 25$^a$ and 25$^b$ respectively, are connected in a bridge circuit which includes the two balancing resisting elements 40 and 41. It is thus seen that the bridge circuit includes four ratio arms or branches, two of which are formed by the conductive path between the two anode ratio arms and the cathode, while the adjustable resistance elements 40 and 41 form the other two ratio arms thereof. As the affected area of one anode ratio arm increases, the affected area of the other ratio arm decreases. Thus, the total area of the space current is proportionately divided between the two circuits 38 and 39 of the bridge system. The conductors 42 and 43 connect opposite terminals of the supply source 48 to the cathode 26 and to the conductors 44 and 45 leading from the adjustable arms 46 and 47 of the variable resistance elements 40 and 41 respectively. A conductor 49 leads from the electron director to the supply source 48. Two differently calibrated galvanometers 50 and 51 are each connected across the bridge circuit. Current fluctuations originating in the power supply source 48 or cathode heating circuit 29 will in no way affect the bridge system or the transmitter or indicator direction because the fluctuations within the opposing arms of the bridge are the same.

If the electron beam is directed on a point N established on the upper end of the ratio arm 25$^a$ midway between the points S—S', the electrons of the beam will be divided equally between the two ratio arms 25$^a$ and 25$^b$, and if the resistance arms 40 and 41 are adjusted so that the right and left course indicator 50 reads zero, or the compass indicator 51 reads north, the bridge will then be balanced. Any angular change in direction that the point N makes with the electron beam would cause the bridge system to become unbalanced, since the ratio of the beam affected area of the two ratio arms 25$^a$ and 25$^b$ is changed. The pointers of the indicators 50 and 51 are consequently moved to the left or right, east or west a corresponding amount, dependent upon the direction and magnitude of the angular change of the beam relative to the point N on the ratio arm 25$^a$.

The faces of the indicators may be graduated into degrees on either side of a zero point, as in the case of left and right course indicator, or it may be graduated in compass directions and degrees. In either case, the face is fixed and right and left turns from an established course or the actual change in course is indicated by a pointer. These two instruments may be combined by including the two face markings on one dial. This combination would naturally necessitate the use of two pointers, one fixed to the shaft of the galvanometer and the other one free for manual adjustment to the zero point. If the right and left course indicator 50 is to be used alone it may be adjusted to any desired course by adjustment of the ratio arms 40 and 41.

Figure 8:
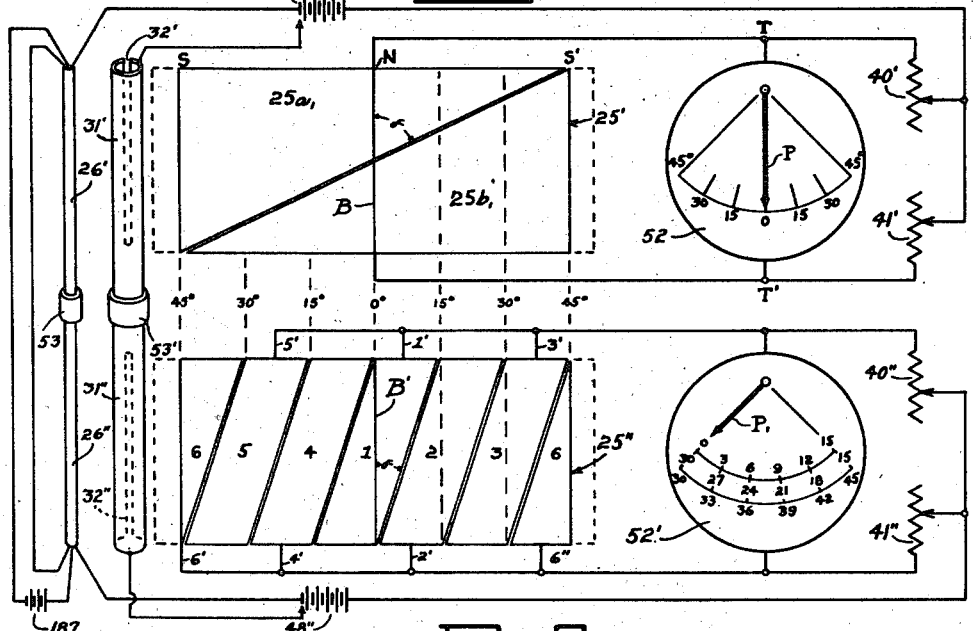
Fig. 8 is a wiring diagram illustrating how the bridge system shown in Fig. 2 may be connected into a tele-indicating system for producing remotely both a fine and coarse indication of an angular position.

One feature of the right and left compass indicator 50 and 51 is that it may be made very sensitive, indicating in minutes and seconds the magnitude change in the angular position. One method of accomplishing this is illustrated in Fig. 8 wherein the space current ratio change between two anode ratio arms is rapid compared to the small angular change between the anode and electron beam. For example, by making the angle $\alpha$ between the diagonal slot of the ratio arms and the mean line of the beam small, rapid ratio changes between the ratio arms will occur for small angular changes of direction. The degree of rapidity of the ratio change or sensitivity of the instrument is dependent upon the cosine of this angle $\alpha$. For example, if the divisional slot formed between two ratio arms were perpendicular or at 90° to the beam, there would be substantially no ratio change with an angular displacement of the beam relative to the two arms, whereas, the ratio change increases as the cosine of the angle $\alpha$ decreases and will be more rapid as the divisional line becomes parallel to the beam. When the edge of the beam or mean line of the beam is parallel to the slot, the instrument becomes erratic and may give false indications of directional change because rapid changes in the beam affected area take place for small angular changes in the position of the beam relative to the anodes. This would occur at the junction of the two edges along line 36 of Fig. 2 indicated by the positions S—S' of Fig. 2, and in order to overcome this inherent disadvantage of the vertical slot, three or more ratio arms are generally employed.

In the modification illustrated in Fig. 8, two complete Wheatstone bridge systems have been provided, one of which is substantially a duplicate of that illustrated in Fig. 2 except for the fact that in the particular modification illustrated the segmental anode ratio arms do not form a complete cylinder. These segmental portions are rather formed so as to define only a portion of a cylinder having an arcuate extension from the points S to S' of substantially 90°. The broken lines indicate the portions extending beyond points S and S' which accommodate the beam's width. The vertical line B is selected to indicate the position of the beam by reference to its mean. This anode 25' is divided diagonally so as to form the two anode ratio arms 25$a_1$ and 25$b_1$.

For an angular change in position equivalent to 45°, either to the left or right, the anode ratio arms will be moved from the position N, wherein a portion of the electron beam formed by the director 31' is equally divided between the said ratio arms to a position S or S', wherein one of said ratio arms will have its maximum effective area within the electron beam. The ratio arms 25$a_1$ and 25$b_1$ and the cathode 26' are connected to the two resistance elements 40' and 41' so as to form a Wheatstone bridge with the divisional portion of the electron beam received by each anode arm forming two of its current paths. The two adjustable resistance ratio arms 40' and 41' form the other two current paths. A power supply source 48' is connected to the cathode 26' and the adjustable arms for each resistance element 40' and 41'. When the anode ratio arms 25$a_1$ to 25$b_1$ are in the position indicated at point N the resistances 40' and 41' are each adjusted so that the bridge will be balanced, that is, points T and T' will be at the same potential. However, when the anode ratio arms are moved relative to the beam to a position S or S', the potential difference between points T and T' will be a maximum and a maximum current will flow in the circuit including the repeating instrument 52, whereby the indicator P for this instrument will have its maximum angular displacement.

In the second bridge circuit the anode 25" is divided diagonally into seven segmental portions, each forming an anode ratio arm. These segmental portions are numbered 1 to 6 inclusive, with segments 6 shown divided and positioned at both ends of the arcuate extension of said cylindrical portion, and each having a portion indicated by broken lines extending beyond the points S and S' forming a seat for the electron beam, the position of the medial line of which is indicated at B', and electrically connected to a common terminal. The odd numbered ratio arms are all connected together electrically by means of the conductors 1', 3', and 5'. and form one branch of the Wheatstone bridge circuit, while the even numbered arms are also connected together electrically by conductor 6', 4', 2' and 6" and form another branch of the Wheatstone bridge circuit. The resistance elements 40" and 41" form the other two branches of this bridge circuit. A power supply source 48" is connected to the cathode 26" and to the adjustable arms for the resistance units 40" and 41". The heating circuit for the cathodes 26 and 26" includes the battery 187.

In the space-discharge device illustrated in Fig. 8, a single envelope is preferred which encloses the said cathodes 26' and 26", and the electron directors 31' and 31" which are each provided with longitudinal slots 32' and 32", each of which has a longitudinal extension equivalent to the length of the electron emissive cathode 26' and 26". These slots are also properly aligned so that the area of the directed beam will be confined within the same longitudinal planes. The anode groups are positioned relative to each other so that when a portion of the beam formed by the emission of the cathode 26 is divided equally between the ratio arms 25 and 25$^a$, a single anode ratio arm 1 of the second group receives the maximum emission from the electron beam formed by the slot 32" from the emission of the cathode 26". This single anode is connected so as to form a single arm of the second bridge circuit, and when the anode is in the position wherein its maximum beam affective area is within the electron beam the adjacent anode ratio arms 4 and 2 receive equal parts of the electron emission, depending upon the width of the beam. An instrument 52' is connected to give a fine indication of the coarse angular change depicted by the maximum deflection from the zero point of said first instrument.

If each angular change between the beam and the anode is equal to one-third the distance from N to S' the pointer P of the indicating instrument 52 connected to the first bridge will have moved 15° to indicate the angular change. The beam whose mean is indicated at B in the second bridge will also have moved the same distance relative to points N and S', but the pointer $P_1$ of the repeating instrument 52' will have moved from a position of maximum deflection in one direction to a position of maximum deflection in the other direction to indicate on an enlarged scale the angular change of 15°. The advantages of this system should be readily apparent since when the right or left indications are used, the maximum deflection must be recorded on one-half the face area of said coarse indicating instrument 52, but with the fine indicating instrument the entire face area may be used to give only a fraction of the angular change indicated by the calibration on one-half the face area of said coarse indicating instrument.

For diagrammatic purpose only, I have shown two separate cathodes secured together with the insulating collar 53 and two director tubes 31 and 31' also secured together with an insulating collar 53' and with the slots axially aligned. However, it is obvious that a single electron director having a single slot of length equivalent to the length of an emitting area of a single cathode may be provided.

As has been pointed out heretofore, the type of Wheatstone bridge arrangement illustrated in Figs. 2 and 8 may find other applications. For example, a pendulum may be used to provide the stabilizing force to position said anode ratio arm relative to the electron directors, in which event the repeater system would be useful as a precision fire control instrument in detecting the roll and the pitch of a vessel.

The design of such an instrument is illustrated in Fig. 7 wherein the sealed envelope 55 encloses two upright frame members 56 and 57, which rigidly support between them the cathode 58 and the electron director 60. The director is provided with a rectangular slot 61 cut therein. The anode 62 consists of a diagonally split segmental portion of a cylinder having an arcuate extension equal to about 180°. This anode is mounted in close proximity with the cathode and electron director so as to establish a relatively short electron path. The two portions of the anode are insulated from each other along the diagonal line 63 and are connected to form two anode ratio arms $62^a$ and $62^b$, each of which is supported by and rigidly attached to a shaft 64 which is journalled by the two upright frame members 56 and 57. The anode ratio arms are thus free to take any angular position relative to the cathode and director as a result of the angular displacement of the envelope 55 and frames 56 and 57 relative to the vertical, as established by the pendulously stabilized ratio arms $62^a$ to $62^b$.

For example, if the tube is mounted so that the axis of the shaft 64 is parallel to the fore and aft axis of a ship or aircraft, the frames 56 and 57, cathode 58 and the electron director 60 would move with the roll of the craft about its longitudinal axis, whereas the anode would remain in a fixed position relative to the vertical. Thus, any relative movement between the cathode 58 and anode ratio arms $62^a$ and $62^b$ will establish a definite ratio of electrons between these segmental anodes, which ratio changes for each angular change of roll. This ratio change is repeated by an indicator 65 which is connected across the measuring diagonal of the Wheatstone bridge circuit formed by the two conductive paths constituting the divisional portions of the electron beam received by each anode ratio arm $62^a$ and $62^b$ and the resistance elements 66 and 67 which are connected to one terminal of the power supply source 68, the other terminal of which is connected to the cathode 58 which is heated to an emissive temperature by means of an electric circuit connected to the power supply source 69.

Figs. 3 and 4 illustrate another and preferred form of this invention wherein a polarized rotor 70 accurately follows the position of an electron beam through 360° as the beam rotates relative to the four arcuated triangularly shaped segmental anodes 71, 72, 73 and 74 which, when assembled, form a cylindrical surface. In this embodiment, the electron beam is formed from the emission of a cylindrical cathode 78 by the longitudinal slot 75 formed in the electron director 76 which is positioned about the said cathode and which is impervious to the flow of electrons except for the slot 75.

An envelope or bulb 77 encloses the cylindrical electron emissive cathode director 76 and anodes 71, 72, 73, and 74. The cathode 78 is preferably held in a central position relative to the envelope by a supporting structure formed by the insulated discs 81, 82, 83, and 98 which are held in a secure position spaced from each other by means of the rods 84 and 85.

The cylindrical cathode 78 is supported by the insulated discs 81 and 82 and has an insulated and non-emissive portion tapered as at 87 so as to form a guide for the centrally disposed bearing member 88 of the electron director 76. This electron director is provided with an intermediate pivot 95 which rests upon a metal cap 96 secured to an upright 97 which is integrally formed with the base of the enclosing envelope 77.

In Fig. 2, one single magnetized needle 33 is secured to the electron director whereas, in this modification, four magnetized needles 89 are each secured to an insulated disc 80 on approximately the 15° and 45° chords of the said disc in accordance with a preferred form of compass design. A heating circuit for the cathode is illustrated on the drawings at 86.

The anode segments 71, 72, 73 and 74 are each triangularly shaped as is clearly shown in the developed view, Fig. 4, and these anodes are each radially and preferably symmetrically spaced about the cathode so as to form a cylindrical surface. Each anode is secured to the insulated discs 82 and 83 in a position slightly spaced relative to each other so that the adjacent edges of each forms a slot 90 which is diagonally disposed relative to the axis of the composite cylinder formed by the plurality of anode segments.

The edges of the triangular shaped anode segments are not straight, as would appear from Fig. 4, but are curved so that the configuration of the slot 90 will correspond to the configuration of the spaced edges of the adjacent anode segments. This curved slot produces a linear relationship between the angular position of the rotor 70 and the angular position of the medial line of the beam relative to a zero reference point on an anode ratio arm. The formula used in determining the shape of the spaced edges of the anodes will be more particularly set forth in connection with Fig. 6. It will be apparent, however, from inspection that the axis of the rotor 70 coincides with the resultant field of the energized coils to indicate the tele-indicated angle; and it is further apparent that the angular position of this rotor 70 is determined by the ratio of the field strength in the energized coils, i. e., the angle between the rotor and the axis of the coil is equal to the arc-tangent of field strength of one coil divided by the field strength of another adjacent coil, or is equal to the current flow in one coil divided by the current flow in an adjacent coil.

Leads 91, 92, 93 and 94 are each connected to the respective anodes and pass through the envelope forming a sealed terminal in a manner well known in the art. Each terminal formed by the projecting leads is connected respectively to a coil 101, 102, 103 and 104 of the movable magnet type of repeating instrument, indicated generally at 100 on the drawing. Lead 99 connects the director to the potential source 120 so as to establish a potential relative to anode and cathode.

This repeater instrument consists essentially of a housing (not shown) for enclosing two frame members 105 and 106 which form supports for the jeweled bearings 108 and 109. A shaft 107 to which the compass card 110 and the magnetized rotor member 70 are secured for rotation therewith is journalled in these bearings. Secured to the frame 106 are two equal but differentially wound coils 102 and 104. These coils are positioned so that their axes will coincide. Spaced 90 degrees from the axis of the coils 102 and 104 are two equally and also differentially wound coils 101 and 103 which are each secured to the frame member 105. One end of each of the coils 101 to 104 inclusive is connected to a common junction indicated at 113 on the drawing. This junction is connected by means of a conductor 114 to one side of the power supply source 120. The other side of this power supply source is connected to the cathode 78 by means of the conductor 115.

The operating principles of the repeating instrument 100 are similar to the operating principles of the Thompson galvanometer. When four ratio armed coils are used, and it should be understood that the instrument will work satisfactorily with only three coils or any number in excess of four, as will be apparent from the explanation accompanying the disclosed modification illustrated in Fig. 9, one of each set of coils which are spaced 90 degrees from each other is adapted to be energized by the flow of electrons from its associated activated segmental anode of the transmitter. Each coil thus energized will produce a magnetic field at right angles to its face in a direction determined by the manner in which it is wound and will have a magnitude dependent upon the beam affected area of its anode or the amount of space current received by its respective segmented anode.

The total number of electrons that reach the respective segmental anodes of the transmitter will flow through associated coils of the indicator so that the polarized rotor member 70 will be positioned to coincide with the resultant field thus produced. The position of this indicator relative to the coils and frame will be indicated on the compass card 110 by virtue of the lubber's line 112 which is secured to the said frame. It should be apparent on inspection of Fig. 3 that a conventional magnetic compass may be modified to function as a repeating instrument by providing the conventional compass with the accurately positioned equally wound coils 101 to 104. The advantage of this design resides in the fact that the instrument would function as a magnetic compass even if the repeating system should become inoperative.

The electron director 76 is positioned angularly with respect to a point on any one of the anodes either by virtue of the earth's magnetic field or by virtue of some other external field applied thereto for controlling the position of the magnetized members 89 so that the angular changes in the relative position of the anode and the beam cause the beam to pass over the surface of the segmental anodes so that substantially its total cross sectional area will be proportioned between the anodes by the slot 90 formed by the adjacent spaced edges thereof. Thus, the proportionate area of each anode segment forming a seat in the electron stream will be dependent upon its position relative to the said directional beam which is formed by the longitudinal slot 75 of the electron director 76.

If the vertex of the triangular shaped anode 72 falls within the earth's magnetic meridian so that the electron beam will strike the anode 71 at a point E, the anode will receive substantially the total electron emission of the cathode. The maximum current will flow in the coil 101 connected to this anode and in the direction indicated by the arrows. The axis of the magnetic field produced by the current flowing in coil 101 will cause the magnetized needle 70 to take the position as illustrated in Fig. 3.

If the transmitter and the repeater were to be mounted on a vessel or craft so that the point E on the anode 71 and the lubber's line 112 of the repeating instrument would fall within the fore and aft axis of the craft upon which the repeating instrument is mounted the magnetized needle and the compass card 110 would take a position relative to the zero reference mark or lubber's line 112 indicating the magnetic direction.

Now for any angular change of position of the craft's head relative to the magnetic meridian, the triangular shaped anode 71 and coil 101 would each take a position relative to the earth's magnetic field corresponding to the angular position of the craft. The anode 71 would therefore no longer receive the electron beam at the point E, but would be moved to some new position, for example, to a point SE wherein the beam would be divided equally between two of the segmental anodes 71 and 74.

This point SE represents a position 45° displaced from the position indicated at point E. Therefore, the resulting magnetic field formed by the current flowing in coils 101 and 104 would fall along a line 45° to the axis of each field, and since each of these coils has been moved to a new angular position 45° displaced from the angle of position illustrated in Fig. 3, the resulting field would remain in a plane containing the earth's magnetic meridian.

The compass needle 89 and repeater rotor 70 and card 110 would therefore have remained stationary while the coils 101 to 104, frame 105, 106, zero reference mark or lubber's line 112, etc., would have moved to a position 45° displaced from the position indicated in Fig. 3. The lubber's line would therefore indicate the SE position.

It should be understood that when the electron beam falls on the anode segments at any of the cardinal points N, S, E or W shown in Fig. 4, the width of the beam will be such that two adjacent anodes will receive a certain portion of the electron emission particularly near the apex of the triangularly shaped anodes. This overflow of electrons will not prevent the middle segmental anode from retaining full control over the position of the magnetized rotor element 70 since the other two coils connected to the other two anode segments create fields opposing each other which cancel out.

If the indicator is to be graduated with equal divisions, the angular movement of an anode rotor arm relative to the beam must result in an equal angular movement of the magnetized rotor member 70 of the indicator 100. In other words, in order that a straight line relationship exists between the angle generated by the medial line of the beam from a zero reference point on the anode, hereinafter referred to as $\phi$, and the angular relation between the resultant field and the axis of the coil connected to the reference anode segment, hereinafter referred to as $\theta$, it is essential that the spaced edges of the segmental anode have some configuration other than a straight line. Since if a straight line slot as illustrated in Fig. 4 divides the adjacent segments, the relation between $\phi$ and $\theta$ will be indicated in the dot and dash curve illustrated in Fig. 6.

Figure 6:
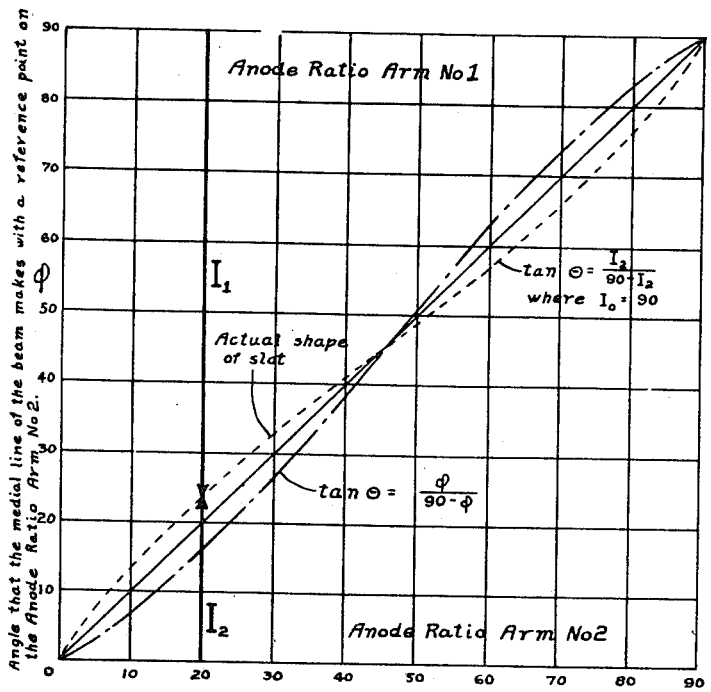
Fig. 6 is the plot of a curve depicting the particular shape of a slot formed at the space edges of adjacent anode segments necessary to produce a linear relation of angular change in direction to angular change in the resultant field of the repeater instruments illustrated in Figs. 3 and 5.

In Fig. 6, there is represented by means of rectangular coordinates the plot of a curve showing in broken lines the shape of a slot which will produce a linear relationship between $\phi$ and $\theta$. This curve is plotted from the equation:

$$\text{tangent } \theta = \frac{I_2}{I_1}$$

or $$\text{tangent } \theta = \frac{I_2}{k - I_2}$$

wherein $k = I_2 + I_1$ and $k$ is the total current. $I_1$ is the current magnitude in the coil connected to a first anode segment, and $I_2$ is the current magnitude in the coil connected to a second and adjacent anode segment. This formula will give the relative value of current flow in each coil for any angular position of $\theta$ to produce a straight line relationship between the angles $\phi$ and $\theta$. This linear relationship of angular change of direction $\phi$ to angular change of resultant field to the axis of the coil makes it possible to design a compass repeater that will have equally spaced divisions indicating equal change in magnetic direction. This formula is derived as follows:

Considering the straight line configuration of the anode edges as illustrated in Fig. 4 wherein adjacent anode segments 71 and 72 are shown connected to the coils 101, 102, $I_1$ and $I_2$ represent the current magnitude in coils 101 and 102 respectively and $I_1 + I_2 = k$, which is constant and is equal to the total current I.

Let $H_1$ equal the field strength of coil 101 and $H_2$ equal the field strength of coil 102, wherein $H_1 = KI_1$ and $H_2 = KI_2$ since the coils 101 and 102 have an equal number of turns, etc.

It is apparent from an inspection of Fig. 4 that the tangent of the angle $\theta$ is equal to $$\frac{H_2}{H_1} \text{ or } \frac{I_2}{I_1} = \frac{I_2}{k - I_2}$$

Since the current in each coil is directly proportional to the ratio division of the beam between two adjacent anode segments; i. e., since the current is directly proportional to the beam affected area of each anode and this area is equal to $wh$ wherein $w$ is the width of the beam and $h$ is the mean altitude, then the current in each is directly proportional to the mean altitude and may be expressed in terms of $\phi$ thus: $I_2 = b\phi$ wherein $b$ is a constant, because a straight line 90' divides segments 71 and 72. Therefore, $I_2$ will increase directly in accordance with an increase in the angle $\phi$, but since $I_1 + I_2 = k$ $$I_1 + b\phi = k \text{ and } I_1 = 0 \text{ when } \phi = 90°$$

$$I_2 = k \text{ when } \phi = 90°$$

therefore, $$I_2 = b\phi, \text{ thus } k = 90b \text{ or } b = \frac{k}{90}$$

and $$I_2 = \frac{k\phi}{90}$$

Furthermore, since it is desirable to express $\theta$ in terms of $\phi$ to show that $\phi$ and $\theta$ do not vary linearly substitute in the equation $$\text{tangent } \theta \frac{I_2}{k - I_2}$$

values of $I_2$ in terms of $\phi$ thus:

$$\text{tangent } \theta = \frac{k\phi}{90} \bigg/ k - \frac{b\phi}{90} = \frac{\phi}{90} \bigg/ 1 - \frac{\phi}{90} = \frac{\phi}{90 - \phi}$$

The plot of this curve $$\text{tangent } \theta = \frac{\phi}{90 - \phi}$$

is illustrated in the dot dash lines of Fig. 6.

It is apparent from this curve that for an angular change of $\phi$ of say 20° $\theta$ will lag 4° since the value of $\theta$ derived from the equation $$\text{tangent } \theta = \frac{\phi}{90 - \phi}$$

for a value of $\phi$ of 20° is equal to only 16°.

It is therefore apparent that if the angular change in $\phi$ is to equal the angular change in $\theta$ the ratio of $I_2/I_1$ must be that which in accordance with the plot of equation $$\text{tangent } \theta = \frac{\phi}{90 - \phi}$$

will produce an angle $\theta$ equal to the angle $\phi$.

Since on the curve shown in Fig. 6 $\phi$ and $\theta$ vary between 0° and 90° let $I_1 + I_2$ equal 90° and $$\text{tangent } \theta = \frac{I_2}{90 - I_2}$$

when plotted, will give the true configuration of a slot necessary to produce straight line ratio between $\phi$ and $\theta$.

This equation $$\frac{I_2}{I_1} = \text{tangent } \theta$$

will hold only when a four coil instrument is being used, since it is only in a four coil instrument that the resultant field's angular position is determined by a consideration of the arc tangent of the ratio of its components resolved along the axis of the coils. Anode segments in excess of four may, however, be used and the equation then becomes $I_2/I_1$=tangent $N\theta$ wherein N is equal to the number of anode segments over four wherein $\theta$ varies from 0 to 360°/N with N equal to the number of anode segments.

Fig. 5 illustrates a modification of the type of tele-indicating system shown in Fig. 3 wherein a sealed envelope 115 of the transmitter encloses a supporting structure made up of a plurality of discs 116, 117, 118 and 119, each of which is formed of a suitable insulating material which, for the purpose of clarity in illustration are shown as transparent.

These discs are retained in a position axially spaced from each other and from the base of the enclosing structure 115 by means of a plurality of rods 126 and 127. A cylindrical cathode 128 is secured to the discs 118 and 119 and extends upwardly therefrom. A top, non-emitting and insulated portion of said cathode is provided with a combination guide ring and metal cap bearing 130 which is adapted to receive the pivot or point 129 which is secured to an end of the electron director through a supporting plug 137. This cathode is also provided with a heating circuit which is indicated on the drawings by means of reference numeral 149.

The tube or electron director 135 is formed of a material which is impervious to the flow of electrons therethrough and which is provided with a rectangular slot 136 which extends lengthwise of the tube a distance along the cathode 128 equal to the emitting portion thereof so that a rectangular beam of electrons will be formed by the emission from said cathode. A conductor 109 connects the director with the power supply source 150 so that a suitable potential may be impressed thereon.

Secured to the supporting plug 137 is an upright rod 138 which has a magnet indicated generally at 140 and shown in an enlarged view, Fig. 10, secured to an end thereof. A magnet 145 which has a polarity opposite to that of the magnet 140 is secured to the upper disc 116 and axially spaced a distance from the magnet 140. The mutual attraction between the magnetic poles of these magnets tends to lift the director 135 axially of the enclosing envelope 115 in order to reduce the friction at the cap and pivot 129 and 130.

These magnets are preferably formed of an alloyed material or metal having high coercive force and lasting retentivity. Such an alloy containing aluminum-cobalt-nickel is obtainable on the market under the trade name of Alnico. It is preferable to have the magnet formed of a hard material since the attractive force between the opposite poles of an improperly designed magnet may be insufficient to cause the pivotal point 146 to engage its bearing recess 147 formed in the pole face of magnet 145. Since the hard surfaces of the magnetic alloy may also be highly polished, the coefficient of friction encountered at the point of contact between the pivotal point 146 and the polished surface 147 is materially reduced. Bearing inserts may also be provided to reduce the friction at point of contact.

A disc 148 is secured to the electron director below its pivot 129 and has secured thereto four magnetized members 149 which are positioned on the 15° and 45° chords of the disc similar to the design illustrated in Fig. 3.

The arcuate shaped rhomboidal anode segments 121, 122, 123 and 124 are radially and preferably symmetrically spaced relative to the cathode 128 and electron director 135 so as to form a cylindrical surface. Each of these segments is secured to the disc members 117 and 118 in a position wherein each segment is slightly spaced relative to the other segment so that the adjacent spaced edges will form a slot which is indicated on the drawing at 155. This slot is helically disposed relative to the axis of the cylinder and relative to the slot 136 formed in the electron director 135 and forms a divisional line for the exposed areas of the portion of the anode segment forming a seat within the electron beam. This slot has a configuration equivalent to that indicated in the plot of the curve $$\text{tangent } \theta = \frac{I_2}{90 - I_1}$$

as shown in Fig. 6.

Leads 131, 132, 133 and 134 are each connected to the respective anode segments and passed through the enclosing envelope forming a sealed terminal in a manner well known to the art. Each terminal is connected respectively to a slip ring 141, 142, 143 and 144 by means of a brush contact 141′, 142′, 143′ and 144′. The slip rings 141, 142, 143, and 144 are each secured to a shaft 156 which is journaled in the bearings 157 which are each secured to the frame members 158 and 159. Each of the coils 151, 152, 153 and 154 is secured to the shaft 156 so as to rotate therewith and has an end which is connected to a common junction 125. The other end of each of said coils is connected to its respective slip ring 141, 142, 143 and 144. Coils 153 and 151 are equally and differentially wound, and positioned within the magnetic field formed by the permanent magnet whose polar extremities are shown at 160 and 161 so that their common axes are 90° displaced from the common axes of coils 152 and 153, each of which is also equally and differentially wound.

One side of the power supply source 150 is connected to the junction 125 by means of the brush 162′ and slip ring 162 whereas the other end of the supply source is connected by means of conductor 163 to the cathode 128. Secured to the shaft 156 of the repeating instrument is a magnetic compass card 164 which indicates angular displacement or magnetic directions by reference to the zero index or lubber's line 165.

In operation, the principles embodied and the type of repeating instrument disclosed are similar to those embodied in the d'Arsonval galvanometer except that in this instrument four or more coils are employed. The resultant magnetic field formed by the current flow in a single coil of each of said sets, which are 90° displaced, will be aligned axially with the magnetic field produced by the permanent magnet members whose polar extremities are indicated at 160 and 161 in the drawing.

In this type of repeating instrument damping is essential in order that the indicating compass card may come quickly to rest. The moving coils of the permanent magnet moving-coil type of the repeater instrument are usually wound on a light aluminum frame (not shown) which is suspended in the air gap between the poles 160 and 161 of the permanent magnet. This metal frame, in moving through the strong magnetic field, will set up eddy currents which effectively damp its motion.

Although it should not be difficult to make the instrument perfectly aperiodic, a slight undamping is often preferred because it gives the observer an opportunity to, at all times, note that the movement of the instrument is perfectly free.

If damping is to be provided for the movable polarized rotor of the type of repeating instrument illustrated in Fig. 3, the instrument may be enclosed within a metallic housing. This housing shall be secured to the frame members and the magnet will be free to rotate within this housing. The magnet on moving relative to the housing will set up eddy currents within the metal housing which tend to damp its motion.

In order to eliminate any stray fields from affecting the position of the compass card, a soft iron shield may be massed around the indicator mechanism and will greatly reduce any disturbing effect of such a disturbing magnetic field. The permanent magnet moving coil type instrument illustrated in Fig. 5 will be uninfluenced by comparatively strong external fields.

Four anode segments have been shown in each of the embodiments illustrated in Figs. 3 and 5. It should be apparent, however, that in the event greater stabilization is desired a greater number of these segments may be used.

In Fig. 5A there is illustrated by means of a fragmentary view a modification of Fig. 5 wherein an enlarged electron director 135' is provided. The sides of the slot 136' formed in this electron director subtend a much larger angle as measured from the longitudinal axis of the director than do the sides of the slot 136. The cross-sectional area of the beam thus formed will be increased. The advantage in the use of an electron director of increased diameter resides in the fact that the spreading out of the beam is reduced since the length of the path from the edge of the slot is much smaller.

Figure 9:
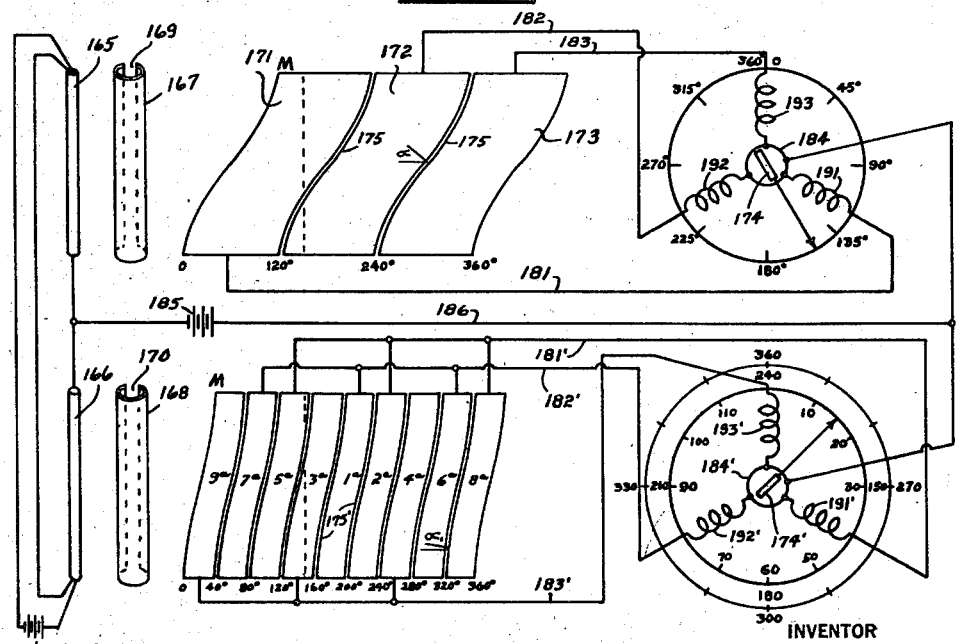
Fig. 9 is a wiring diagram showing how the invention illustrated in Fig. 3 may be utilized in a tele-indicating system for producing fine and coarse indications of an angular position.

The modification of this invention as illustrated in Fig. 9 shows the circuit connection necessary for converting the general type of tele-indicating system disclosed in Fig. 3 into a system which will produce at a distance remote from the transmitter both a coarse indication and a fine indication of an angular position. The transmitter consists essentially of a vacuum tube having a sealing envelope not disclosed in the view illustrating this modification but enclosing the separate cathodes 165 and 166, each of which is secured to the enclosing structure in a manner similar to that disclosed in Figs. 3 and 5. Surrounding both of these cathodes and rotatable relative thereto are the respective director elements consisting specifically of metallic tubes 167 and 168 which are each impervious to the cathode emission, except for the rectangular slots 169 and 170 cut in each tube and extending longitudinally thereof for a distance substantially equivalent to the length of the emitting portion of the cathodes 165 and 166. These metallic tubular members are supported for rotation relative to the cathodes, this rotary movement being effected by means of a magnetized member similar to that illustrated in Figs. 2, 3 and 5. The slots 169 and 170 are aligned relative to each other so that the rectangular beam of electrons formed by the cathode emission and reaching the anodes through the rectangular slots 169 strikes in a zero reference position the anode segments which form a seat within this beam so that the beam affected area of each of the anode segments is substantially equal.

Equally and symmetrically spaced from the cathode 165 and the electron director 167 are a plurality of arcuated and rhomboidally shaped anode segments 171, 172, and 173, which are insulated from each other so that the divisional line 175 formed by the edges of each of said segments divides the beam between adjacent anode segments and the slope of this line relative to the beam determines the rate of electron change between adjacent anode segments for an angular change in the position of the beam relative to each segment.

In other words, the arcuate extent of each segment, or the angle subtended by points O and M on the cylindrical surface formed by the anode segments determines the degree of sensitivity of this instrument. The smaller this angle is compared to the angle formed by the axis of adjacent coils of the repeating instrument the greater is the sensitivity. Leads 181, 182 and 183 connect each anode segment with one of the respective coils 191, 192 and 193 of the repeating instrument. The other end of each of the coils forms a common terminal 184 which is connected to one side of the supply source 185 by means of the conductor 186. The other side of the supply source 185 is connected to each of said separate cathodes 165 and 166 which also has a common heating circuit indicated on the drawings at 187'. The axis of each of the coils is generally co-planar and is symmetrically spaced at equal angles of 120°.

A pivoted and polarized rotor member 174 is mounted so as to be positioned by the resultant field produced by the energization of each of the respective coils, whereby the pointer secured thereto will indicate an angular position which is equivalent to the angular position that a point on the anode makes with the beam. The points OM on the dividing lines 175' formed by the edges of the plurality of rhomboidally shaped anode segments positioned radially and symmetrically about the cathode 166 and director 168 and indicated on the drawings by reference numerals 1ª to 9ª inclusive, subtend equal angles as measured from the axis of the cylinder equal to 360°/N wherein N is the number of segments, or 40°. It is noted that this angle is less than the angle subtended by point O and M on the anode segments 171 to 173 inclusive. Consequently, the rate of electron change is greater in the anode segments 1ª to 9ª inclusive for an equal angular displacement than it is in the anode segments 171 to 173 inclusive. Every third segment of the anode surrounding the cathode 166 is connected to a common terminal to which the leads 181', 182' and 183' are each connected. More specifically, segments 1ª, 6ª and 7ª are connected to the coils 192' by the lead 182', segments 2ª, 5ª and 8ª are connected to coil 191' through the conductor 181', and segments 3ª, 4ª and 9ª are connected to coil 193' through the conductor 183'. The axis of each of the coils of this repeating instrument is substantially coplanar and spaced 120°. One end of each coil is connected to the common terminal 184', which is, in turn, connected to the supply source 185. It is apparent from the foregoing that for an angular change in position of the beam relative to the anode equal to 120 mechanical degrees, the rotor 174' will have made a complete revolution, since an anode segment connected to each coil will have formed a seat in the electron beam as it moves over the cylindrical surface formed by the anode segment.

Figure 18:
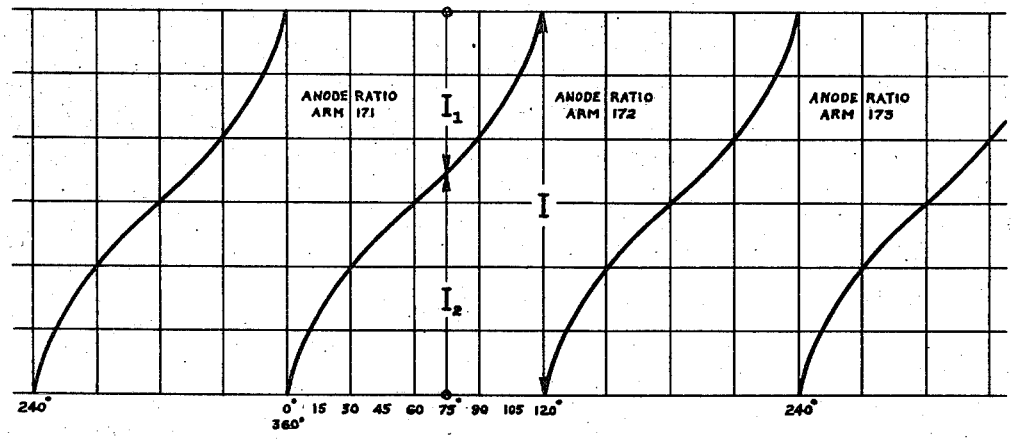
Fig. 18 is a diagrammatic illustration of the plot of a curve obtained from the vectors illustrated in Fig. 17.
Figure 17:
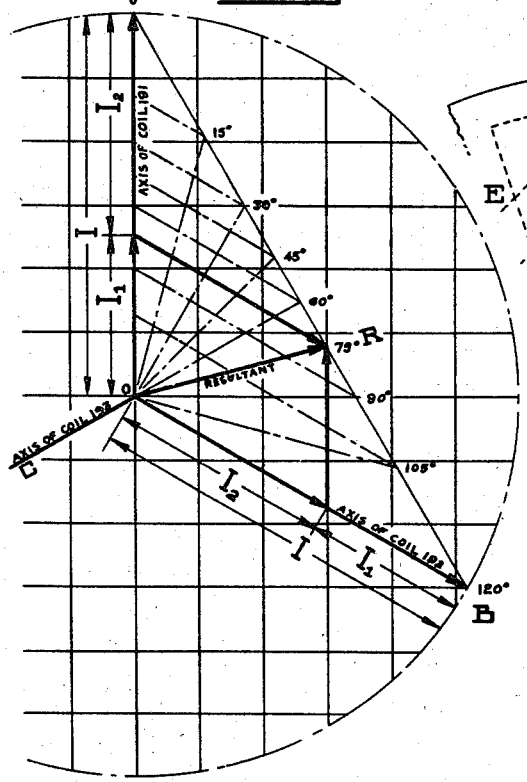
Fig. 17 is a diagrammatic illustration of the current vectors used in deriving the shape of the anode segments for the modifications illustrated in Fig. 9.

It should be herein pointed out that since a repeating instrument having but three equally spaced coils is used, the configuration of the edges of each of the anode segments, such as the edge OM, is not determined by the plot of the equation which was used to determine the configuration of the edges of the anode segments in the modifications illustrated in Figs. 3 and 5, wherein a four-coil repeating instrument was used. Figures 17 and 18 illustrate diagrammatically a method for determining the configuration of the edges of the anodes which will produce a linear relationship between the angle generated by the medial line of the beam from a reference point on the anode and the angular position of the rotor. Lines OA, OB and OC represent the axes of the coils 191, 192, 193, and subtend on the circle A, B, C, equal arcs of 120 degrees each. The length of these lines is selected to represent the total value of current flow ($I_0$) equal to $I_1$ and $I_2$. The resultant magnetic field produced by the energization of coils 191 and 192 is illustrated at OR. The components producing this resultant field are plotted in terms of current magnitude $I_1$ and $I_2$ along the lines representing the axis of each coil or along the lines OA and OB. The locus of the point R of the vector OR representing the resultant magnetic field is the line AB. The components $I_1$ and $I_2$ are laid off along the lines OA and OB for every 15 degree position of the resultant OR, and the values of these components are plotted to derive the curve illustrated in Fig. 18, which determines the configuration of the anode segments 171, 172. Similarly, the shape of the edges of the anode segments 1ª to 9ª inclusive, are determined by plotting to scale of the components of the resultant field. In this particular instance, however, the abscissae are reduced one-third, since there are three times as many anode segments as there are coils.

As illustrated in Fig. 9, the beam is positioned at an angle of substantially 150° relative to a zero mark on the anode segment 171. The position of the rotor 174 indicates this angular position of the beam relative to the point on the anode surface, whereas, the rotor 174' will take a position determined by the energization of coils 191' and 193' each of which is energized in proportion to the exposed areas of the anode segments 3ª and 5ª which form a seat within the electron beam. The position, as illustrated, is 15° from the zero reference mark.

This invention may take a form substantially different from the form disclosed in Figs. 1 to 10 inclusive, which will have the advantage of reduced size and weight and which is particularly useful and well adapted for use as an aircraft instrument to reproduce accurately magnetic directions at a distance remote from the transmitter. The preferred form of this modification is illustrated in Figs. 11 to 13 inclusive.

In the modification illustrated in Figs. 11 to 13, the transmitter consists of a compact disclike vacuum tube having a sealed envelope, indicated generally at 200. This envelope encloses the axially spaced disc members 205 and 207, each of which is secured to the spacing rods 208 by methods well known to the art. The disc 205 is made of a material having high electrical conductivity and in the form of a wire mesh so that light rays may readily pass therethrough. This disc is split by the radial lines into quadrants designated on the drawing at 201, 202, 203 and 204, which are secured together but insulated from each other so as to form the sector shaped anodes of the vacuum tube. Intermediate the two discs 205 and 207 is an electrostatic guard ring 206 which is positioned centrally and symmetrically of the axis of the discs 205 and 207. A rectangularly shaped electron emissive cathode 210 is insulatably secured to the lower disc 207 in a rectangularly shaped opening so as to be symmetrically positioned relative to the center of this disc.

In order to form a somewhat restricted path of electron emission from the cathode an electron guide 215 is positioned between the cathode and the anode. This electron guide is generally disc shaped, having a diameter substantially equal to but spaced from the inner diameter of the electrostatic guard ring 206 and is secured to a shaft 216, substantially medially of the ends so as to lie slightly below the plane of the guard ring 206. The shaft 216 is journaled in the cap bearings 217 and 218 which are respectively secured to the top and bottom of the frame 219. The object of the guard ring 206 is to insure a uniform distribution of charges on the movable electron guide 215 so that the lines of force which leave it are uniformly distributed over its surface. The rotatable electron guide 215 is provided with a sector shaped opening 220 which has a radius substantially equal to the diagonal $d$ of the rectangular cathode 210 and has an arcuate extension of approximately 90°. The electron guide 215 also carries on its under side two or more magnetized rods 225 and 226.

Figure 14:
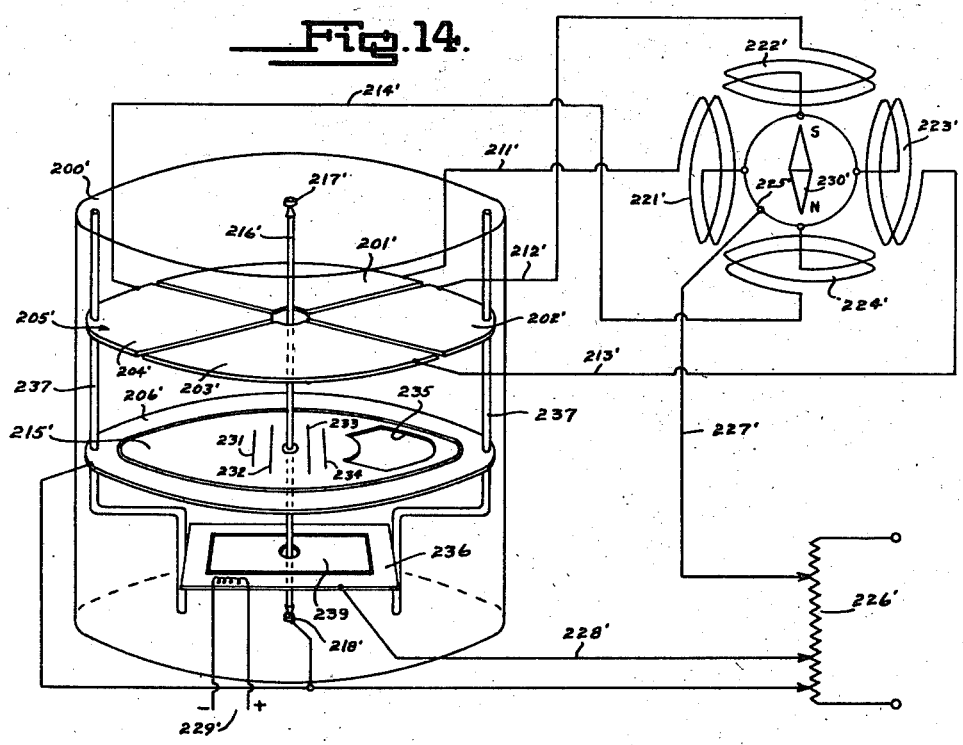
Fig. 14 is an exploded view of a modification similar to that illustrated in Fig. 11.
Figure 19:
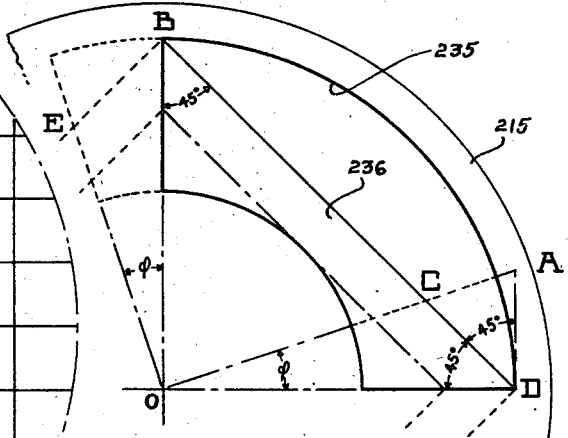
Fig. 19 is a diagrammatic illustration of the modifications illustrated in Figs. 12 and 14 showing graphically the derivation of the formula for the current ratios.

It should be noted in comparing this modification with Fig. 14 that these magnetic rods are longer than those disclosed in this latter modification and are also spaced at a greater distance from the center of the shaft 216, so that the electron guide will have a comparatively low period of oscillation. It should also be noted that in this modification movement of the electron guide relative to the anode and cathode will cause the exposed portion of the cathode which underlies each anode quadrant to change, and with a photoemissive cathode 210 the light rays emanating from the source S will penetrate the wire mesh anodes and strike the exposed portions of the cathode, causing these portions to emit electrons which are attracted to the positively charged anodes through the opening formed in the electron guide 215. It is also noted that because of the fact that the cathode is rectangular in shape each angular change that a point on the cathode or anode makes with the point on the electron guide causes the ratio of the exposed areas of the cathode underlying adjacent anode sectors to vary as the tangent of the said angular change. This will be better apparent from a consideration of Fig. 19 illustrating diagrammatically the particular shape of the cathode and electron guide which proportions the electron flow between the adjacent anode segments. In this illustration the electron guide 215 is positioned so that the sides of the opening 235 coincide with the diagonals of the rectangular cathode 236 so that the portion of the cathode uncovered lies entirely within the area of the anode 202. This anode will therefore receive the full electron flow. As the director is moved through an angle $\phi$ the anode 202 receives only a proportionate share of the total electron flow which is proportional to the length of the side BC of the exposed cathode, whereas an adjacent anode 201 receives its proportionate share of the electron flow proportional to the length of the side BE of the exposed cathode. In order for the indicator 230 to follow linearly the position of the electron guide 215 through an angle $\phi$ the ratio of the side EB/BC must equal the tangent of the angle $\phi$. The tangent of $\phi$ is, however, equal to $$\frac{AD}{OD}$$

The triangle ADC is similar to triangle OBC; therefore, AD is to OB as CD is to CB, and since BE and CD are equal the tangent $\phi$ is equal to EB/BC. Leads 211, 212, 213 and 214 connect the four quadrants with an end of their respective coils 221 to 224 inclusive, the other end of each of which is connected to the common terminal 225. The lead 227 connects this terminal to the variable potential supply source 226. The other end of the supply source is connected to both the electron guide 215 through the shaft 216 and to the electrostatic guard ring 206. The potential difference between the electron director and the anodes is adjusted so that the mechanical forces present in the electrostatic field will be such that the force $f$ will be sufficient to reduce the gravitational forces produced by the electron guide 215 on the bearing 218 in order to reduce the friction encountered therein. The value of this potential difference may be computed in accordance with the following equation:

$$f = \frac{V^2 k A}{8\pi X^2}$$

wherein X is the axial distance between the anode and the electron guide and A is the area of the smaller of these two elements which, in the illustrated embodiment, is the electron guide 215 and $k$ the dielectric coefficient.

The lead 228 connects the cathode to the supply source 226 so that the cathode will remain negative relative to the anodes but will have a positive potential relative to the electron guide 215. Consequently, the mechanical forces produced as a result of the electrostatic field which exists between these two elements must be subtracted from the forces present in the electrostatic field occurring between the anode sectors and the electron guide. In this modification a photo emissive cathode is preferred because the thermionic type requires an increase in temperature before it becomes electron emissive. However, a heating circuit 229 is provided for producing a temperature rise in cathode 210 in the event a thermionic type is to be used. The lower disc member 207, which forms a support for the cathode 210, is preferably formed of a suitable conductive metal which will have a tendency to damp the movement of the electron director.

In the position illustrated in the drawing the anode sector 202 forms a seat in the beam formed by the opening 220; that is, substantially the entire area of the cathode which underlies this anode sector is exposed; therefore, substantially all of the electrons reaching the anode sectors will be received by anode sector 202 and a maximum current will flow in coil 222. The pivoted polarized needle 230 will take the position illustrated in Fig. 11 as a result of the energization of coil 222.

The structure illustrated in Fig. 14 is modified to the extent that four short magnetized rods 231, 232, 233 and 234 are positioned inside of the substantially sector shaped opening 235 so that the period of the electron guide will be much shorter than the period of the rotatable electron guide modification illustrated in Fig. 11. The rectangular shaped cathode 236 must also be spaced at a greater distance from the shaft 216' since it must underlie the opening 235 formed in the electron guide 215. The cathode is also shown as secured to the uprights 237 and to the inner metallic damping plate 239 so as to be insulated therefrom. The anode sectors 201' to 205' are in this modification formed of solid metallic plates, since no provision is made for use of a cathode material which is light sensitive. The remaining portion of the structure illustrated in this modification is substantially identical with the structure illustrated in Fig. 11; consequently, corresponding parts have been indicated by corresponding reference numerals, except that in this modification the numerals are given a prime designation.

In the modifications illustrated in Figs. 11 and 14 rectangular cathodes are employed. However, it should be understood that the cathode may take some configuration other than that disclosed in these modifications. In fact, in Fig. 15 a modification is illustrated wherein a circular ring shaped cathode 240 (shown in dotted lines) is employed. The electron guide disc 242 overlies this circular cathode and has a diameter slightly in excess of the diameter of the cathode. A slot 243 is cut in the guide disc in the portion overlying the cathode 240. The configuration of the sides of the slot is such that the pointer on a repeating instrument connected to the space discharge device will follow linearly the angular change of the guide relative to the cathode.

Figure 16:
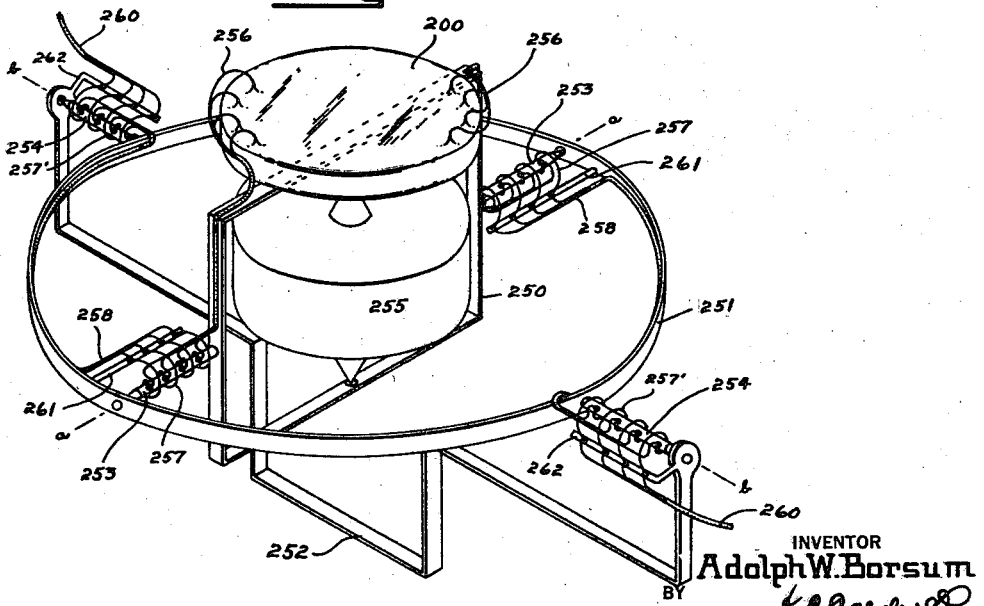
Fig. 16 is a diagrammatic view illustrating the gyroscopically stabilized vacuum tube of the type illustrated in Figs. 11 or 14.

In order to take into account the roll and pitch of the craft on which the type of instrument illustrated in Figs. 11 to 15 is mounted, the transmitter envelope 200 is secured to the gimbaled frame member 250 of a spinning gyro 255, as illustrated in Fig. 16. The gyroscopic mass 255 must be made of a heavy non-metallic material and is journaled for rotation about its axis of spin in the frame 250. This frame is pivoted to a circular gimbal ring 251 for rotation about the axis $a$—$a$. While the gimbaled frame is rotatable about the axis $b$—$b$ the shafts 253 and 254 are secured respectively to the frame 250 and to the gimbaled ring 251 so as to form the pivoted or gimbaled supports therefor. The leads 256 which protrude from the sealed envelope 200 are each connected to the shaft end of the fine coiled spring of conductive material 257 which is insulatably secured to the shaft 253 and rods 261, 262. The rods 261 are secured to the ring 251, whereas the rods 262 are secured to the frame 252. Conductors 258 are connected to the other end of each of the coiled springs at the junction with rods 261 and lead around the gimbal ring 251 to the shafts 254 where the end of each of the conductors is connected respectively to the end of a second set of fine coiled springs 257' which is insulatably secured to the shaft 254. The free ends of this second set of coiled springs are connected to the conductors 260 which lead to a repeating instrument of the type illustrated in Figs. 11 and 14.

When the transmitter is so mounted its axis of rotation may be maintained vertical; that is, the magnet supported by the electron disc 215 may be made to revolve in a horizontal plane, in which case the transmitter will transmit the angular position of the fore and aft axis of the craft in relation to the horizontal component of the magnetic meridian. All compass directions will therefore be measured in the horizontal plane.

If the craft maintains a constant angular position of its horizontal component with the meridian, the craft may roll and pitch without affecting the transmitted indication of its magnetic direction.

In accordance with the patent statutes the preferred embodiments of this invention have been illustrated. It is understood that the broad principles embodied in this invention are known and have illustration in prior art adaptations. It should, however, be apparent from the foregoing description that many improvements in these prior art devices are to be found herein. The foremost is perhaps attributable to the described configurations of the slotted electron directors forming a beam of the electron emission and the shape of the dividing line between anode segments which causes this beam to be divided between the anodes so that the ratio of the beam affected area of one anode to the beam affected area of another anode will vary with changes in position of the beam as the tangent function of an angle. Further advantages are to be found in the structure disclosed in the various embodiments, and particularly in the apparatus for obtaining both coarse and fine indications of angular displacements, and in the use of a pendulously stabilized anode for tele-indicating vertical angles. The Wheatstone bridge circuit is utilized with the divided electron beam forming two branches thereof for obtaining a fine degree of linearity in tele-indicated angles.

Obviously all improvements cannot be set forth here, nor can all of the various embodiments of this invention be presented. It should be understood that the present invention is not restricted to the embodiments illustrated and that the invention may be practiced within the scope of the appended claims otherwise than specifically illustrated and described.

The invention described herein may be manufactured and used by or for the Government of the United States of America for governmental purposes without the payment of any royalties thereon or therefor.

I claim:

1. A space discharge device comprising an electron emissive cathode, a plurality of anodes spaced from said cathode, beam forming means for restricting to a beam the stream of electrons reaching said anodes, and means for obtaining relative rotation between said beam and said anodes to generate an angle, said anodes being serially positioned about the axis of rotation and the adjacent edges of adjacent portions of said anodes having a configuration to cause the ratio of the beam affected area of one of said anodes to the beam affected area of an adjacent anode to vary as the tangent function of said generated angle.

2. A space discharge device comprising means for producing a stream of electrons, a conductive member split into a plurality of separate portions electrically insulated from each other forming a plurality of separate segmental anodes, and means for producing rotary movement between said beam and said segmental anodes to change the beam affected area of said anodes, the adjacent edges of adjacent portions of said anodes having a configuration to cause the ratio of the beam affected area of one of said anode portions to the beam affected area of an adjacent anode portion to vary in response to said rotary movement as the tangent function of an angular variation from 0° to 90°.

3. A space discharge device comprising a disc-like barrier element rotatable about an axis, an electron emissive cathode axially spaced from said barrier element, a disc radially divided into sectors axially positioned from said element on the side opposite said cathode, each sector being symmetrically mounted about said axis with the adjacent radial edges of each forming a dividing line electrically spacing each sector into separate anodes, said barrier element being impervious to the emission of said cathode except for an open portion formed therein having two radial sides, and an arcuate side struck from a center coincident with the axis of said barrier element, and a sealed envelope enclosing said anode, cathode and barrier elements.

4. A discharge device having a sealed envelope, means including a rod-like cathode within said envelope for producing an electron beam having a substantially rectangular cross-sectional configuration, a cylindrical divided conductive member enclosed within said envelope forming a plurality of anodes, said anodes being positioned axially and symmetrically about said cathode to receive said electron beam, the total affected beam area of said anodes being divided between not more than two adjacent anodes, and means secured to said means for producing an electron beam for producing relative rotation between said anodes and electron beam whereby the beam affected area of one anode will be increased and the beam affected area of an adjacent anode will be simultaneously decreased.

5. A space discharge device having a sealed envelope, means including a rod-like cathode within said envelope for producing a stream of electrons having substantially a rectangular cross-sectional configuration, a divided arcuate conductive member enclosed within said envelope and concentric with said cathode, forming a plurality of anodes and having its divisional portions insulated from each other, at least one dividing line forming said divisional portions being at an angle relative to the longitudinal axis of said cathode, and rotatable means connected to said beam forming means for producing relative rotary movement between said anodes and electron beam whereby the effective receiving area of one divisional portion of said anode will be increased while the effective receiving area of an adjacent divisional portion will be simultaneously decreased.

6. A space discharge device having a sealed envelope, an electron emissive cathode within said envelope, a plurality of arcuate shaped overlapping segmental anodes spaced axially and symmetrically about said cathode, means concentric and rotatable about said cathode for forming the electron emission from said cathode into an axially extending beam of substantially rectangular cross-section, said means effecting relative rotation between said electron beam and anode segments for causing the distribution of electrons between said anode segments to vary, the spaced edges of each of said anode segments having a configuration substantially equivalent to the plot of the equation $$\tan n\theta = \frac{A_2}{A_1}$$

wherein $A_2$ is the beam effective area of one anode segment and $A_1$ is the beam effective area of an adjacent anode segment with $A_1+A_2$ equal to a known constant, and wherein $n$ is equal to 90° divided by 360°/N with N equal to the number of anode segments, and with $\theta$ varying between 0 and 360°/N.

7. A space discharge device comprising a disclike barrier element, an electron emissive cathode axially spaced from said barrier element, an electrically conductive plate axially positioned from said element on the side opposite said electron emissive cathode, said plate being divided into a plurality of equal segments each serially arranged about the axis and electrically insulated from each other forming separate anodes for receiving the electron emission of said cathode, the divisional lines of each adjacent segment being coincident with equiangularly spaced radii extending from said axis, said barrier element being impervious to the electron emission of said cathode except for an open portion formed therein, the open portion of said plate having radial sides angularly spaced equal to the equiangular spacing of said divisional lines, and a sealed envelope enclosing said plate element and electrode.

8. A space discharge device comprising an electron emissive cathode, a plurality of segmentally formed anodes spaced from each other and radially from said cathode jointly forming a substantially cylindrical surface about said cathode, the spaced longitudinal edges of adjacent anodes forming an angle with respect to the axis of generation of the cylindrical surface formed by said anodes, a rotatable barrier element positioned about said cathode and between said cathode and anode and impervious to electron flow, said barrier element having a rectangular slot formed therein substantially parallel to the axis of the cylindrical surface for permitting passage of a restricted beam of the electron emission of said cathode, a magnetized member secured to said element for effecting relative rotation between said anode and said element, whereby the effective area of each anode receiving the electron beam will be reciprocally varied as the anodes are scanned by the electron beam, and a sealed envelope enclosing said cathode, anodes, barrier element and magnetized member.

9. A space discharge device having a sealed envelope, means within said envelope for producing a beam of electrons having substantially a rectangular cross-sectional configuration, a divided conductive member forming a plurality of anodes, the dividing line of said conductive member being at an angle relative to a line which is parallel to an edge of said rectangular beam so that the electrons constituting the beam are in one position thereof divided equally between two of the divisional portions of said conductive member, means attached to said means for producing a beam of electrons, for retaining said beam parallel to magnetic lines of force, and means insulating and securing said anode within said envelope whereby upon angular movement of said envelope relative to said magnetic field said beam will be reciprocally divided between two divisional portions of said conductive member forming separate anodes.

10. A space discharge device comprising a sealed envelope enclosing a longitudinally disposed electron emissive cathode, a plurality of segmentally formed anodes enclosed within said envelope and spaced axially about said cathode forming a cylindrical surface, said segmentally formed anodes being slightly spaced relative to each other, each of their adjacent spaced edges forming an angle with respect to the axis of the cylinder formed by said anodes, a shield impervious to electron emission surrounding said cathode and having a rectangular slot formed therein for producing a directional beam of the electron emission, and means for providing relative rotation between said anodes and said shield to cause simultaneously a decrease in the area of the directed beam impinging against one anode with a corresponding increase in the area of the directed beam impinging against an adjacent anode.

11. A space discharge device including a cathode, a cylinder divided diagonally into a pair of anodes surrounding said cathode, means between said cathode and said anodes for forming from the electron emission of said cathode an electron stream of a restricted cross-sectional area, and means secured to the electron stream forming means for producing relative rotation between said electron stream and anodes whereupon the cross-sectional area of said electron stream impinging upon one of said anodes will be increased while the cross-sectional area of said electron stream impinging upon the other of said anodes will be decreased.

12. An apparatus for producing remotely a coarse and fine indication of an angular displacement comprising a space discharge device having a sealed envelope, an electron emissive cathode within said sealed envelope, means forming from the cathode emission a beam of electrons having a substantially rectangular cross-sectional configuration, plural sets of anodes positioned radially and axially of said cathode at substantially equal radii to form a seat within respective portions of said beam, the number of anodes of one set being greater than the number of anodes of another set, the anodes of each set being spaced relative to each other so that their spaced edges form an acute angle relative to the rectangular beam, with the spaced edges of the anodes in the set which has the greater number of anodes forming a more acute angle relative to the edge of said beam than the spaced edge of the anodes in the set having the lesser number, means responsive to an angular displacement producing relative movement between said sets of anodes and said beam, means responsive to the change in beam affected area of adjacent anodes in the anode set having the lesser number of anodes for coarsely indicating the angular displacement, and means responsive to the change in beam affected area of adjacent anodes in the anode set having the greater number of anodes for finely indicating the angular displacement.

13. A space discharge device comprising an electron emissive cathode connected to an input terminal, a pair of anodes each connected to an output terminal and mounted in spaced relation from said cathode to receive the electron emission therefrom, said anodes being spaced from each other and having one adjacent longitudinal edge of each forming an angle with respect to the longitudinal axis of the discharge device, a barrier element positioned between said anodes and said cathode and rotatable about said longitudinal axis, said barrier element being impervious to the electron flow, said barrier element having a longitudinal slot formed therein for permitting passage of a narrow beam of the electron emission having a substantially rectangular cross-sectional configuration, and a magnetized member secured to said barrier element to retain same in a fixed position relative to an external magnetic field, whereby the rectangular beam, when impinging against said anode, will be divided between said anodes by the adjacent longitudinal edges in accordance with the directional position of said anode.

14. An apparatus for producing remotely a coarse and fine indication of an angular position comprising means producing a directional electron stream, a sealed envelope enclosing said stream, a power supply source, a pair of multiple circuits constituting the arms of a Wheatstone bridge connected thereto, each circuit including in at least one angular position an equal portion of said electron stream constituting the zero potential point of said bridge, and means responsive to a change in angular position for varying the portion of said path included in each circuit so that a change in said angular position causing an increase in the portion of said path included in one circuit causes a simultaneous and equal decrease in the portion of the path included in said other circuit whereby a galvanometer when connected across said bridge will respond to the difference in current flow in each multiple circuit; a second pair of multiple circuits connected to said supply source constituting the arms of a second Wheatstone bridge, each circuit including in a plurality of angular positions an equal portion of said electron stream constituting a zero potential point of said bridge, the number of angular positions constituting zero potential points of said second bridge being a multiple of the number of angular positions constituting zero potential points of said first bridge, and means responsive to any change in angular position from any of said zero potential points for varying the portion of said electron stream included in each circuit so that a change in an angular position causing an increase in the portion of said electron stream included in one circuit causes simultaneously a correspondingly equal decrease in the portion of said path included in said other circuit whereby a second galvanometer when connected across said bridge will respond to the difference in current flow in each multiple circuit.

15. In a tele-indicating system for obtaining remotely a coarse and fine indication of an angular position, a first bridge network having input and output terminals including a space discharge device having an electron emission cathode connected to said input terminal, means for obtaining a restricted beam having a substantially rectangular cross-sectional configuration from the electron emission thereof, a pair of independent anodes adapted to receive the rectangular beam said anodes being spaced from each other and configured so that an adjacent spaced edge of each forms an angle relative to the longitudinal beam, so that the beam when impinging upon said anodes at said adjacent spaced edges will be proportionally divided between said anodes according to its position relative to said anodes, and means connecting each anode to an output terminal of said bridge whereby a first indicator when connected across said bridge at the output terminals thereof will indicate the relative position between said beam and anodes; a second bridge circuit having input and output terminals comprising an electron emissive cathode connected to said input terminal, means for obtaining a restricted longitudinal beam from the electron emission of said cathode, a plurality of pairs of independent anodes adapted to receive the longitudinal beam, said anodes being spaced from each other and configured so that the adjacent spaced edges of each form an angle relative to the longitudinal beam whereby the beam when impinging upon said anodes at said adjacent spaced edges will be proportionally divided between said anodes according to its position relative to said anodes, conductors connecting alternate anodes to one of said output terminals, and conductors connecting intermediate anodes to the other of said output terminals whereby a second indicator when connected across said second bridge at the output terminals thereof will indicate the relative position between said beam and anodes; and means responsive to a maximum change in angular position for moving said first beam completely across the face of both of said first anodes, and for moving said second beam completely across the face of all of said plurality of anodes, whereby the deflection of said second named indicator will be a multiple of the angular position indicated by said first indicator equal to the number of pairs of anodes connected in said second bridge network.

16. An electronic system for obtaining remotely a coarse and fine indication of angular position comprising a space discharge device having an electron emissive cathode, means for obtaining a restricted electron stream from the electron emission thereof, a first set of $N_1$ electrodes spaced from said electron emissive cathode so that at least one electrode is within a portion of said stream, a second set of $N_2$ electrodes spaced from the electron emissive cathode so that at least one electrode of said second set is within a remaining portion of said restricted stream, means responsive to a change in said angular position for increasing the area of one electrode of each set within its respective portion of said electron stream and simultaneously decreasing the area of an adjacent electrode of said same set within its electron stream, the electrodes of each set being spaced relative to each other and arranged so that for a maximum change in angular position the area of all electrodes of each set will have been included in its respective portion of said electron stream, an electrical power supply source, a first and a second instrument each having $N_1$ coils and a pointer positioned by the resultant magnetic field thereof, conductors connecting each coil of said first instrument to said supply source through a separate electrode, and conductors forming $N_3$ multiple circuits connecting said second instrument to said supply source through said electrodes whereby the deflection of said first pointer will duplicate the angular position, whereas the deflection of said second pointer will be equal to $N_3$ times the angular deflection of said first pointer wherein $N_3$ is equal to $N_2/N_1$ and $N_1$, $N_2$ and $N_3$ are all integers.

17. In a tele-indicating system for producing both a coarse and a fine indication of an angular deflection to the right or left of a fixed point, the combination comprising a first Wheatstone bridge circuit including a space discharge device having a plurality of electrodes, at least one of which is electron emissive, connected to form two ratio arms thereof, a second Wheatstone bridge including a space discharge device having a plurality of electrodes at least one of which is electron emissive connected to form two ratio arms thereof, each of said space discharge devices having means for producing a restricted beam of the electron emission of said electrodes; rotatable means proportioning a substantially constant cross-sectional area thereof between at least two of said remaining electrodes, and means coupling together the rotatable means of each space discharge device so that when the cross-sectional area of the electron beam of the said space discharge devices connected in said first bridge is proportioned equally between two of said electrodes the cross-sectional area of the electron beam of said space discharge device connected in said second bridge is contained substantially entirely within the area of one of said electrodes.

ADOLPH W. BORSUM.

REFERENCES CITED

The following references are of record in the file of this patent:

UNITED STATES PATENTS

| Number | Name | Date |
|---|---|---|
| 2,283,103 | Stewart | May 12, 1942 |
| 2,155,420 | Gunn | Apr. 25, 1939 |
| 1,610,316 | Quilter | Dec. 14, 1926 |
| 1,997,936 | Thomas | Apr. 16, 1935 |
| 2,068,775 | Stettler | Jan. 26, 1937 |
| 2,225,032 | Carbonara | Dec. 17, 1940 |
| 2,179,673 | Smith | Nov. 14, 1939 |
| 1,360,235 | McAlpine | Nov. 23, 1920 |
| 2,277,027 | West | Mar. 24, 1942 |
| 2,153,565 | Isaacson | Apr. 11, 1939 |
| 2,254,610 | Kunze et al. | Sept. 2, 1941 |
| 2,096,653 | Soller | Oct. 19, 1937 |
| 2,199,177 | Hollmann | Apr. 30, 1940 |
| 2,114,054 | Kormann | Apr. 12, 1938 |
| 2,203,824 | Kollsman | June 11, 1940 |
| 2,221,743 | Wagner | Nov. 12, 1940 |
| 2,254,036 | Gray | Aug. 26, 1941 |

FOREIGN PATENTS

| Number | Country | Date |
|---|---|---|
| 106,556 | British | May 31, 1917 |